United States Patent
Chen et al.

(10) Patent No.: US 11,206,054 B2
(45) Date of Patent: Dec. 21, 2021

(54) COMMUNICATION METHOD AND DEVICE

(71) Applicant: HUAWEI TECHNOLOGIES CO., LTD., Guangdong (CN)

(72) Inventors: Zheng Chen, Beijing (CN); Lixia Xue, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 26 days.

(21) Appl. No.: 16/704,945

(22) Filed: Dec. 5, 2019

(65) Prior Publication Data

US 2020/0106475 A1 Apr. 2, 2020

Related U.S. Application Data

(63) Continuation of application No. PCT/CN2018/102783, filed on Aug. 28, 2018.

(30) Foreign Application Priority Data

Sep. 15, 2017 (CN) .......................... 201710853767.2

(51) Int. Cl.
*H04W 72/04* (2009.01)
*H04B 1/7143* (2011.01)
(Continued)

(52) U.S. Cl.
CPC ........ *H04B 1/7143* (2013.01); *H04W 72/042* (2013.01); *H04W 72/0446* (2013.01);
(Continued)

(58) Field of Classification Search
CPC ........ H04B 1/7143; H04L 5/00; H04W 72/04; H04W 72/042; H04W 72/0446;
(Continued)

(56) References Cited

U.S. PATENT DOCUMENTS

2012/0281680 A1* 11/2012 Bostrom ........... H04W 72/0446
370/336
2013/0100896 A1 4/2013 Chen et al.
(Continued)

FOREIGN PATENT DOCUMENTS

CN 102083219 A 6/2011
CN 103024904 A 4/2013
(Continued)

OTHER PUBLICATIONS

NTT Docomo et al.: "DL/UL resource allocation",3GPP Draft; R1-1716104,Sep. 12, 2017 (Sep. 12, 2017), XP051329763,total 8 pages.

*Primary Examiner* — Robert J Lopata
(74) *Attorney, Agent, or Firm* — Womble Bond Dickinson (US) LLP

(57) ABSTRACT

A communication method and a communications device are provided, to improve flexibility of transmitting a physical uplink shared channel resource. In at least some embodiments, first indication information is generated by a network device, where the first indication information is used to indicate one or more frequency hopping bandwidths used by a terminal device to send a physical uplink shared channel resource to the network device. The first indication information is sent by the network device to the terminal device. The methods provided in the embodiments may be applied to a communications system, e.g., vehicle to everything (V2X), vehicle-to-vehicle (V2V), internet of vehicles (IoV), to improve an autonomous driving capability of a vehicle.

20 Claims, 13 Drawing Sheets

(51) Int. Cl.
  *H04W 80/02* (2009.01)
  *H04W 80/08* (2009.01)
(52) U.S. Cl.
  CPC ....... *H04W 72/0453* (2013.01); *H04W 80/02* (2013.01); *H04W 80/08* (2013.01)
(58) Field of Classification Search
  CPC . H04W 72/0453; H04W 72/12; H04W 80/02; H04W 80/08
  USPC .......................................... 370/329
  See application file for complete search history.

(56) References Cited

U.S. PATENT DOCUMENTS

| | | | | |
|---|---|---|---|---|
| 2013/0322493 | A1* | 12/2013 | Jersenius | H04B 1/713 375/133 |
| 2015/0270868 | A1 | 9/2015 | Park | |
| 2016/0100422 | A1 | 4/2016 | Papasakellariou et al. | |
| 2017/0134068 | A1* | 5/2017 | Ahn | H04L 27/2602 |
| 2017/0207815 | A1 | 7/2017 | Chae et al. | |
| 2017/0208590 | A1* | 7/2017 | Kim | H04W 72/0446 |
| 2017/0257846 | A1* | 9/2017 | Kim | H04L 5/0012 |
| 2018/0109286 | A1* | 4/2018 | Yao | H04B 1/7143 |
| 2019/0028863 | A1* | 1/2019 | Kim | H04W 72/10 |
| 2019/0053211 | A1* | 2/2019 | Ying | H04W 72/044 |
| 2019/0053229 | A1 | 2/2019 | Kim et al. | |
| 2020/0374057 | A1* | 11/2020 | Matsumura | H04L 5/001 |

FOREIGN PATENT DOCUMENTS

| | | |
|---|---|---|
| CN | 106455097 A | 2/2017 |
| KR | 20170016886 A | 2/2017 |
| WO | 2012064098 A2 | 5/2012 |
| WO | 2014110757 A1 | 7/2014 |
| WO | 2017126936 A1 | 7/2017 |

* cited by examiner

COMMUNICATION METHOD AND DEVICE

CROSS-REFERENCE TO RELATED APPLICATIONS

This application is a continuation of International Application No. PCT/CN2018/102783, filed on Aug. 28, 2018, which claims priority to Chinese Patent Application No. 201710853767.2, filed on Sep. 15, 2017. The disclosures of the aforementioned applications are hereby incorporated by reference in their entireties.

TECHNICAL FIELD

This application relates to the field of wireless communications technologies, and in particular, to a communication method and a device.

BACKGROUND

In a long term evolution (LTE) system, a basic unit for uplink resource scheduling is a subframe. One subframe occupies two slots, and each slot occupies seven orthogonal frequency division multiplexing (OFDM) symbols.

For a physical uplink shared channel (PUSCH), to improve a frequency diversity gain, a network device schedules a terminal device to transmit the PUSCH through frequency hopping. Specifically, the network device schedules the terminal device to transmit the PUSCH by using different physical resource blocks (PRB) in different slots of one subframe. For example, as shown in FIG. 1, one subframe includes two slots: a slot 0 and a slot 1. An entire uplink system bandwidth occupies 50 PRBs. Three PRBs are reserved on each side of the entire uplink bandwidth, to transmit a physical uplink control channel (PUCCH). It can be learned that the network device can schedule the terminal device to transmit the PUSCH in remaining 44 PRBs. In the LTE system, the remaining 44 PRBs used to transmit the PUSCH are referred to as a frequency hopping bandwidth of the PUSCH. However, the network device can schedule different PRBs that are in the frequency hopping bandwidth in different slots of one subframe, to transmit the PUSCH. Still referring to FIG. 1, for example, the network device can schedule a PRB 3 and a PRB 4 in the slot 0 to transmit the PUSCH; and can schedule a PRB 25 and a PRB 26 in the slot 1 to transmit the PUSCH.

In a new radio (NR) system, a concept of bandwidth part (BWP) is introduced. A network device can configure one or more uplink bandwidth parts for a terminal device. The uplink bandwidth part includes a group of contiguous PRB resources in frequency domain, and a bandwidth of the uplink bandwidth part may be less than or equal to a maximum uplink bandwidth supported by the terminal device. In addition, as specified in the NR system, the network device can schedule the terminal device to transmit the PUSCH in the uplink bandwidth part. In this case, if a design in the LTE system is used, the network device can schedule the terminal device to perform a frequency hopping transmission in the entire uplink bandwidth part, thereby reducing flexibility of transmitting a PUSCH.

SUMMARY

Embodiments of the application provide a communication method and a device, to improve flexibility of transmitting a PUSCH.

An embodiment of this application provides a communication method, including generating, by a network device, first indication information, where the first indication information is used to indicate one or more frequency hopping bandwidths used by a terminal device to send a physical uplink shared channel resource to the network device; and sending, by the network device, the first indication information to the terminal device.

It should be noted that, in the embodiment of the application, the network device may flexibly indicate the frequency hopping bandwidths of the terminal device, thereby improving the flexibility of transmitting a PUSCH.

In at least some embodiments, the sending, by the network device, the first indication information to the terminal device includes sending, by the network device, higher layer signaling to the terminal device, where the higher layer signaling carries the first indication information; or sending, by the network device, MAC CE signaling to the terminal device, where the MAC CE signaling carries the first indication information; or sending, by the network device, downlink control information signaling to the terminal device, where the downlink control information signaling carries the first indication information.

In at least some embodiments, the generating, by a network device, first indication information includes activating, by the network device, at least one frequency hopping bandwidth in frequency hopping bandwidths of the terminal device, where the frequency hopping bandwidths of the terminal device are configured by the network device for the terminal device based on an uplink bandwidth part on which the terminal device works; and generating, by the network device, the first indication information based on the activated frequency hopping bandwidth, where the first indication information carries the activated frequency hopping bandwidth, and the activated frequency hopping bandwidth is used by the terminal device to send the physical uplink shared channel resource.

In at least some embodiments, each frequency hopping bandwidth of the terminal device includes at least one subband, and the method further includes configuring, by the network device, a quantity of subbands for each frequency hopping bandwidth of the terminal device by using the higher layer signaling.

In at least some embodiments, the generating, by a network device, first indication information includes dividing, by the network device, an uplink system bandwidth into a plurality of subbands; activating, by the network device, at least one subband in subbands that completely overlap with an uplink bandwidth part on which the terminal device works in frequency domain and that are in the uplink system bandwidth; and generating, by the network device, the first indication information based on the activated subband, where the first indication information carries the activated subband, and a frequency hopping bandwidth formed by the activated subband is used by the terminal device to send the physical uplink shared channel resource.

In at least some embodiments, the network device may activate the subband, and the activated subband forms the frequency hopping bandwidth, thereby improving the flexibility of transmitting a PUSCH.

In at least some embodiments, a bandwidth size and a frequency domain position of each subband are preconfigured by a system or configured by using the higher layer signaling.

In at least some embodiments, the network device schedules, in a unit of a slot, the terminal device to send the physical uplink shared channel resource, where one slot includes a first time unit and a second time unit. The method further includes generating, by the network device, second indication information, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth; and sending, by the network device, the second indication information to the terminal device.

In at least some embodiments, the network device may indicate a subband offset value, so that a probability of a collision of the terminal device in an overlapping uplink working bandwidth part can be effectively avoided during frequency hopping.

In at least some embodiments, the generating, by the network device, second indication information includes selecting, by the network device, a subband offset value from a plurality of subband offset values; obtaining, by the network device, a corresponding frequency hopping pattern based on the selected subband offset value; and generating, by the network device, the second indication information based on the frequency hopping pattern, where the second indication information carries the frequency hopping pattern; and when a subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In at least some embodiments, the network device may indicate a subband offset by using the frequency hopping pattern, thereby reducing overheads of the second indication information.

In at least some embodiments, the subband offset value corresponding to the frequency hopping pattern is preset by the network device or is configured by the network device by using the higher layer signaling.

In at least some embodiments, the sending, by the network device, the second indication information to the terminal device includes sending, by the network device, downlink control information signaling to the terminal device, where the downlink control information signaling carries the second indication information.

In at least some embodiments, the method further includes receiving, by the network device in the frequency hopping bandwidth on which the physical uplink shared channel resource is located, the physical uplink shared channel resource sent by the terminal device.

An embodiment of this application provides a communication method, including receiving, by a terminal device, first indication information sent by a network device; determining, by the terminal device based on the first indication information, one or more frequency hopping bandwidths used by the terminal device to send a physical uplink shared channel resource.

In at least some embodiments, the receiving, by a terminal device, first indication information sent by a network device includes receiving, by the terminal device, higher layer signaling sent by the network device, where the higher layer signaling carries the first indication information; or receiving, by the terminal device, MAC CE signaling sent by the network device, where the MAC CE signaling carries the first indication information; or receiving, by the terminal device, DCI signaling sent by the network device, where the DCI signaling carries the first indication information.

In at least some embodiments, the first indication information carries a frequency hopping bandwidth activated by the network device. The activated frequency hopping bandwidth is used by the terminal device to send the physical uplink shared channel resource. The activated frequency hopping bandwidth is at least one frequency hopping bandwidth activated by the network device in the frequency hopping bandwidths of the terminal device. The frequency hopping bandwidths of the terminal device are configured by the network device for the terminal device based on an uplink bandwidth part on which the terminal device works.

In at least some embodiments, each frequency hopping bandwidth of the terminal device includes at least one subband, and a quantity of subbands included in each frequency hopping bandwidth is configured by the network device for the terminal device by using the higher layer signaling.

In at least some embodiments, the first indication information carries a subband activated by the network device. A frequency hopping bandwidth formed by the activated subband is used by the terminal device to send the physical uplink shared channel resource. The activated subband is activated by the network device in subbands that completely overlap with an uplink bandwidth part on which the terminal device works in frequency domain and that are in the uplink system bandwidth.

In at least some embodiments, a bandwidth size and frequency domain position of each subband are preconfigured by a system or configured by using the higher layer signaling.

In at least some embodiments, the terminal device sends, in a unit of a slot, the physical uplink shared channel resource to the network device, where one slot includes a first time unit and a second time unit. The method further includes receiving, by the terminal device, second indication information sent by the network device, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth.

In at least some embodiments, the second indication information carries a frequency hopping pattern. The frequency hopping pattern corresponds to the subband offset value. When the subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In at least some embodiments, the subband offset value corresponding to the frequency hopping pattern is preset by the network device or configured by the network device by using the higher layer signaling.

In at least some embodiments, the receiving, by the terminal device, second indication information sent by the network device includes receiving, by the terminal device, downlink control information signaling sent by the network device, where the downlink control information signaling carries the second indication information.

In at least some embodiments, the method further includes sending, by the terminal device, the physical uplink shared channel resource to the network device in the frequency hopping bandwidth indicated by the network device.

An embodiment of the application provides a network device, including a processor, configured to generate first indication information, where the first indication information is used to indicate one or more frequency hopping bandwidths used by the terminal device to send a physical uplink shared channel resource to the network device; and a transceiver, configured to send the first indication information to the terminal device.

In at least some embodiments, when sending the first indication information to the terminal device, the transceiver is configured to send higher layer signaling to the terminal device, where the higher layer signaling carries the first indication information; or send MAC CE signaling to the terminal device, where the MAC CE signaling carries the first indication information; or send downlink control information signaling to the terminal device, where the downlink control information signaling carries the first indication information.

In at least some embodiments, when generating the first indication information, the processor is configured to activate at least one frequency hopping bandwidth in the frequency hopping bandwidths of the terminal device, where the frequency hopping bandwidths of the terminal device are configured by the network device for the terminal device based on an uplink bandwidth part on which the terminal device works; and generate the first indication information based on the activated frequency hopping bandwidth, where the first indication information carries the activated frequency hopping bandwidth, and the activated frequency hopping bandwidth is used by the terminal device to send the physical uplink shared channel resource.

In at least some embodiments, each frequency hopping bandwidth of the terminal device includes at least one subband, and the processor is further configured to configure a quantity of subbands for each frequency hopping bandwidth of the terminal device by using the higher layer signaling.

In at least some embodiments, when generating the first indication information, the processor is configured to divide an uplink system bandwidth into a plurality of subbands; activate at least one subband in subbands that completely overlap with an uplink bandwidth part on which the terminal device works in frequency domain and that are in the uplink system bandwidth; and generate the first indication information based on the activated subband, where the first indication information carries the activated subband, and a frequency hopping bandwidth formed by the activated subband is used by the terminal device to send the physical uplink shared channel resource.

In at least some embodiments, a bandwidth size and a frequency domain position of each subband are preconfigured by a system or configured by using the higher layer signaling.

In at least some embodiments, the network device schedules, in a unit of a slot, the terminal device to send the physical uplink shared channel resource, where one slot includes a first time unit and a second time unit;

the processor is further configured to generate second indication information, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth; and the transceiver is further configured to send the second indication information to the terminal device.

In at least some embodiments, when generating the second indication information, the processor is configured to select a subband offset value from a plurality of subband offset values; obtain a corresponding frequency hopping pattern based on the selected subband offset value; and generate the second indication information based on the frequency hopping pattern, where the second indication information carries the frequency hopping pattern; and when a subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In at least some embodiments, the subband offset value corresponding to the frequency hopping pattern is preset by the network device or configured by the network device by using the higher layer signaling.

In at least some embodiments, when sending the second indication information to the terminal device, the transceiver is configured to send downlink control information signaling to the terminal device, where the downlink control information signaling carries the second indication information.

In at least some embodiments, the transceiver is further configured to receive, in the frequency hopping bandwidth on which the physical uplink shared channel resource is located, the physical uplink shared channel resource sent by the terminal device.

An embodiment of the application provides a terminal device, including a transceiver, configured to receive first indication information sent by a network device; and a processor, configured to determine, based on the first indication information, one or more frequency hopping bandwidths used by the terminal device to send a physical uplink shared channel resource.

In at least some embodiments, when receiving the first indication information sent by the network device, the transceiver is configured to receive higher layer signaling sent by the network device, where the higher layer signaling carries the first indication information; or receive MAC CE signaling sent by the network device, where the MAC CE signaling carries the first indication information; or receive DCI signaling sent by the network device, where the DCI signaling carries the first indication information.

In at least some embodiments, the first indication information carries a frequency hopping bandwidth activated by the network device. The activated frequency hopping bandwidth is used by the terminal device to send the physical uplink shared channel resource. The activated frequency hopping bandwidth is at least one frequency hopping bandwidth activated by the network device in the frequency hopping bandwidths of the terminal device. The frequency hopping bandwidths of the terminal device are configured by the network device for the terminal device based on an uplink bandwidth part on which the terminal device works.

In at least some embodiments, each frequency hopping bandwidth of the terminal device includes at least one subband, and a quantity of subbands included in each frequency hopping bandwidth is configured by the network device for the terminal device by using the higher layer signaling.

In at least some embodiments, the first indication information carries a subband activated by the network device. A frequency hopping bandwidth formed by the activated subband is used by the terminal device to send the physical uplink shared channel resource. The activated subband is activated by the network device in subbands that completely overlap with an uplink bandwidth part on which the terminal device works in frequency domain and that are in the uplink system bandwidth.

In at least some embodiments, a bandwidth size and a frequency domain position of each subband are preconfigured by a system or configured by using the higher layer signaling.

In at least some embodiments, the terminal device sends, in a unit of a slot, the physical uplink shared channel resource to the network device, where one slot includes a first time unit and a second time unit; and the transceiver is further configured to receive second indication information sent by the network device, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth.

In at least some embodiments, the second indication information carries a frequency hopping pattern; the frequency hopping pattern corresponds to the subband offset value; and when the subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In at least some embodiments, the subband offset value corresponding to the frequency hopping pattern is preset by the network device or configured by the network device by using the higher layer signaling.

In at least some embodiments, when receiving the second indication information sent by the network device, the transceiver is configured to receive downlink control information signaling sent by the network device, where the downlink control information signaling carries the second indication information.

In at least some embodiments, the transceiver is further configured to send the physical uplink shared channel resource to the network device in the frequency hopping bandwidth indicated by the network device.

An embodiment of the application provides a computer readable storage medium, including instructions, where when the instructions executed on a communications device, the communications device performs embodiments of the methods as described herein.

An embodiment of the application provides a chip, where the chip is connected to a memory, and is configured to read and execute a software program stored in the memory, to perform the methods as described herein.

An embodiment of the application further provides a system, where the system includes embodiments of the network device and the terminal device as described herein.

In the embodiment of the application, the network device may configure, for the terminal device based on a requirement, one or more frequency hopping bandwidths used to send a physical uplink shared channel resource, and indicate the frequency hopping bandwidths to the terminal device by using first indication information. Compared with the prior-art manner in which the terminal device transmits the physical uplink shared channel resource by using a fixed frequency hopping bandwidth, the manner in the application can improve flexibility of the frequency hopping bandwidth used by the terminal device to transmit the physical uplink shared channel resource.

DESCRIPTION OF EMBODIMENTS

For ease of understanding, examples of descriptions of concepts related to this application are provided below for reference.

A base station (BS) device may also be referred to as a base station, and is an apparatus that is deployed in a radio access network to provide a wireless communication function. For example, a device providing a base station function in a 2G network includes a base wireless transceiver station (BTS) and a base station controller (BSC); a device providing a base station function in a 3G network includes a nodeB (NodeB) and a radio network controller (RNC); a device providing a base station function in a 4G network includes an evolved nodeB (eNB); a device providing a base station function in a WLAN is an access point (AP); and in a future 5G network such as new radio (NR) or LTE+, a device providing a base station function includes a continuously evolved nodeB (gNB), a transmission and reception point (TRP), or a transmission point (TP). The TRP or the TP may include only a radio frequency part but not a baseband part, or may include a baseband part and a radio frequency part.

A terminal device is user equipment (UE), which may be a movable terminal device, or may be an unmovable terminal device. The device is mainly configured to receive or send service data. The user equipment may be distributed in a network. The user equipment has different names in different networks, for example, a terminal, a mobile station, a subscriber unit, a station, a cellular phone, a personal digital assistant, a wireless modem, a wireless communications device, a handheld device, a laptop computer, a cordless telephone set, a wireless local loop station, and a vehicle-mounted device. The user equipment may communicate with one or more core networks by using a radio access network (RAN) (an access part of a wireless communications network), for example, exchanges voice and/or data with the radio access network.

A network side device is a device located on a network side in a wireless communications network, and may be an access network element, such as a base station or a controller (if any), or may be a core network element, or may be another network element.

The following introduces technical solutions of this application with reference to accompanying drawings.

Figure 1:
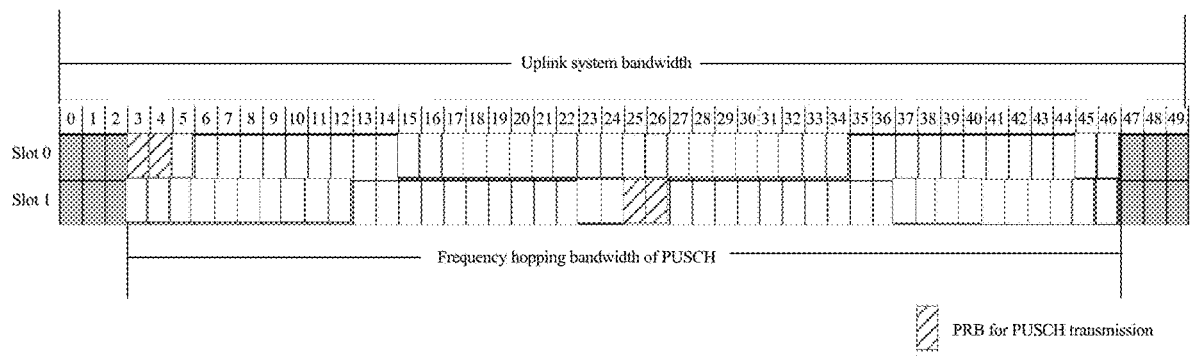
FIG. 1 is a schematic diagram of an uplink system bandwidth according to an embodiment of the application.
Figure 2:
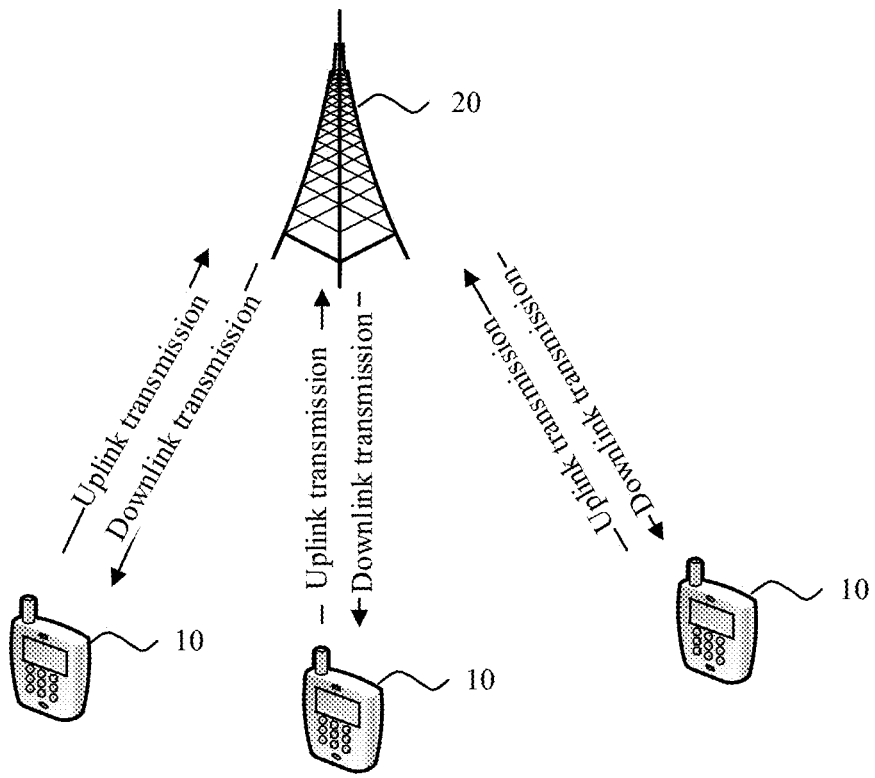
FIG. 2 is a schematic diagram of a communications system according to an embodiment of the application.

FIG. 2 is a schematic diagram of a possible network system according to an embodiment of this application. As shown in FIG. 2, the communications system in FIG. 2 may include a terminal device 10 and a base station 20. The base station 20 is configured to provide the terminal device 10 with a communication service and access to a core network. The terminal device 10 accesses a network by searching for a synchronization signal, a broadcast signal, and the like that are sent by the base station 20, to communicate with the network. Arrows shown in FIG. 2 may indicate uplink/downlink transmission performed by using a wireless communications network between the terminal device 10 and the base station 20.

The communications system may be a new radio (NR) communications system, a long term evolution (LTE) system, or a long term evolution-advanced (LTE-A) system, or may be extended to a similar wireless communications system, for example, a cellular system related to a 3rd generation partnership project (3GPP).

The wireless communications system in this embodiment of this application may be a variety of radio access technology systems, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. Based on factors such as capacities, rates, and delays of different networks, networks may be classified into a 2generation (G) network, a 3G network, a 4G network, or a future evolved network such as a 5G network. A typical 2G network includes a global system for mobile communications/general packet radio service (GSM) network or a general packet radio service (GPRS) network. A typical 3G network includes a universal mobile telecommunications system (UMTS) network. A typical 4G network includes a long term evolution (LTE) network. The UMTS network sometimes may also be referred to as a universal terrestrial radio access network (UTRAN), and the LTE network sometimes may also be referred to as an evolved universal terrestrial radio access network (E-UTRAN). Based on different resource allocation manners, networks may be classified into a cellular communications network and a wireless local area network (WLAN). The cellular communications network is based on scheduling, and the WLAN is based on contention. All the foregoing 2G 3G and 4G networks are cellular communications networks. In addition, the wireless communications system in this application may be applicable to future-oriented communications technologies. Provided that a communications system that uses a new communications technology includes transmission of a physical downlink control channel resource, the communications system is applicable to the technical solution provided in the embodiment of the invention. The system architecture and the service scenario described in the embodiments of the application are intended to describe the technical solutions in the embodiments of the application more clearly, and do not constitute a limitation on the technical solutions provided in the embodiments of the application. One of ordinary skill in the art may know that with the evolution of the network architecture and the emergence of new service scenarios, the technical solutions provided in the embodiments of the application are also applicable to similar technical problems.

Figure 3:
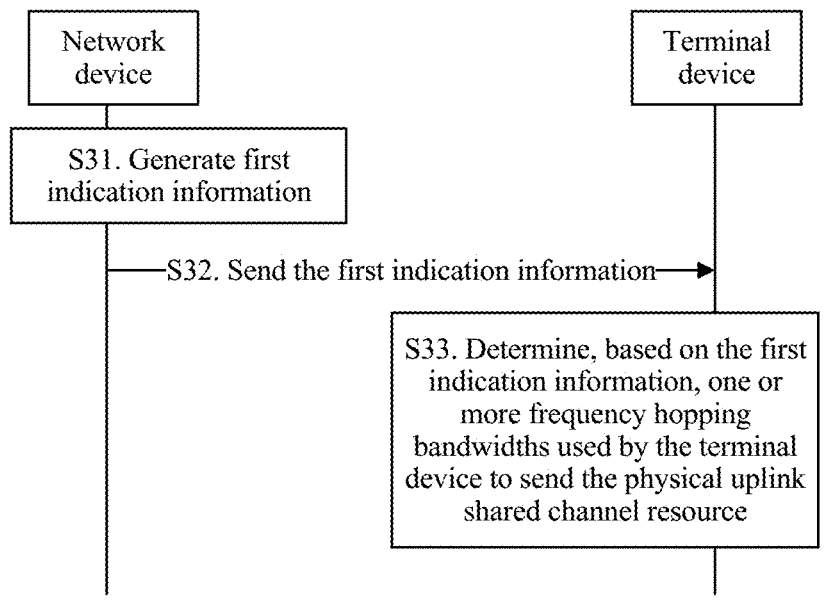
FIG. 3 is a schematic flowchart of a communication method according to an embodiment of the application.

FIG. 3 is a procedure of a communication method according to an embodiment of the application. A terminal device in this procedure corresponds to the terminal device 10 in FIG. 2, and a network device may correspond to the base station 20 in FIG. 2. As shown in FIG. 3, the procedure includes the following operations.

Operation S31: A network device generates first indication information, where the first indication information is used to indicate one or more frequency hopping bandwidths used by the terminal device to send a physical uplink shared channel (PUSCH) resource to the network device.

Operation S32: The network device sends the first indication information to the terminal device.

In the embodiment of the application, the network device may send higher layer signaling to the terminal device, such as radio resource control (RRC) signaling, where the higher layer signaling carries the first indication information; or the network device may send medium access control control element (MAC CE) signaling to the terminal device, where the MAC CE signaling carries the first indication information; or the network device may send downlink control information (DCI) signaling to the terminal device, where the DCI signaling carries the first indication information.

Operation S33: The terminal device determines, based on the first indication information, one or more frequency hopping bandwidths used by the terminal device to send the physical uplink shared channel resource.

In the embodiment of the application, the network device may configure, for the terminal device based on a requirement, one or more frequency hopping bandwidths used to send a physical uplink shared channel resource, and indicate the frequency hopping bandwidths to the terminal device by using first indication information. Compared with the prior-art manner in which the terminal device transmits the physical uplink shared channel resource by using a fixed frequency hopping bandwidth, the manner in the application can improve flexibility of the frequency hopping bandwidth used by the terminal device to transmit the physical uplink shared channel resource.

Figure 4:
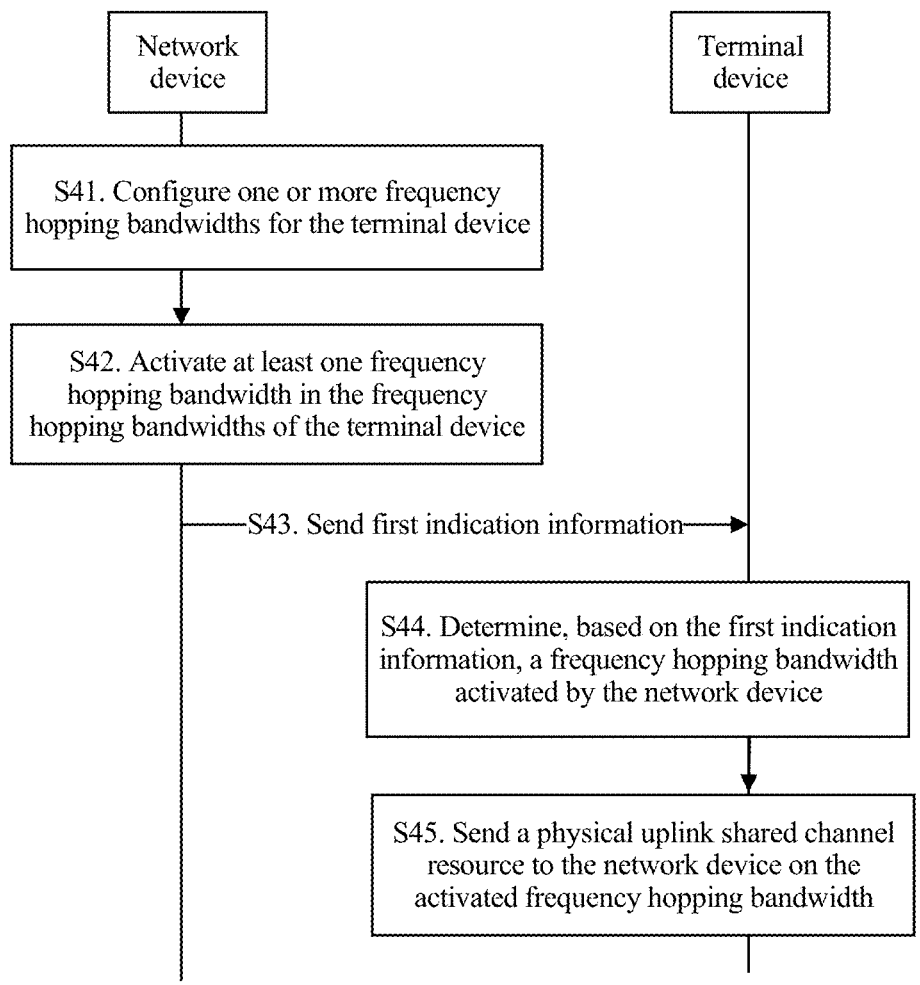
FIG. 4 is another schematic flowchart of a communication method according to an embodiment of the application.

FIG. 4 is a procedure of a communication method according to an embodiment of the application. A terminal device in this procedure corresponds to the terminal device 10 in FIG. 2, and a network device may correspond to the base station 20 in FIG. 2. As shown in FIG. 4, the procedure includes the following operations.

Operation S41: The network device configures one or more frequency hopping bandwidths for the terminal device.

Figure 5A:
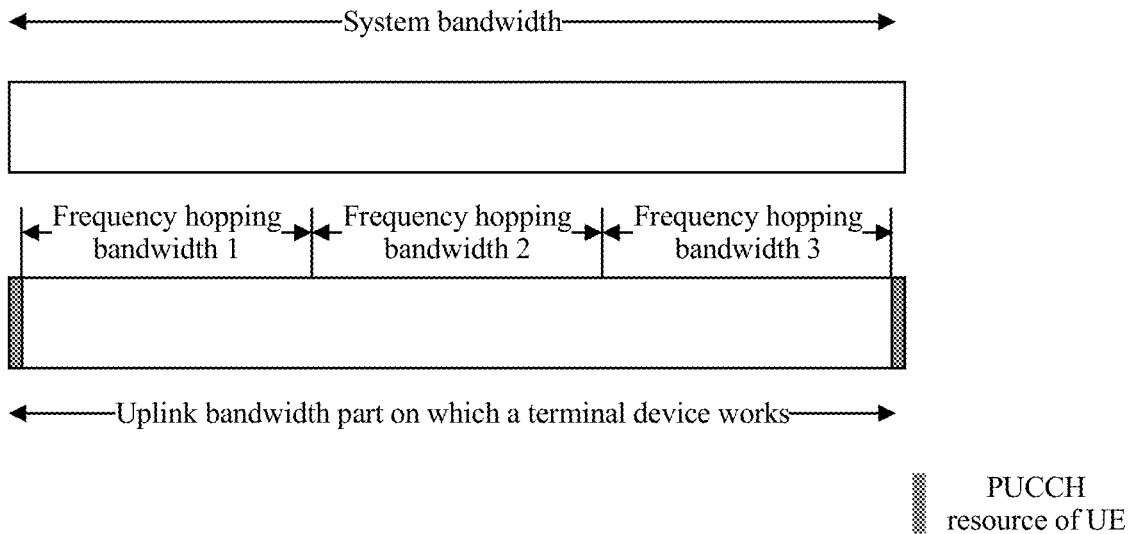
FIG. 5a, FIG. 5b, and FIG. 6 are schematic diagrams of frequency hopping bandwidths according to an embodiment of the application.
Figure 5B:
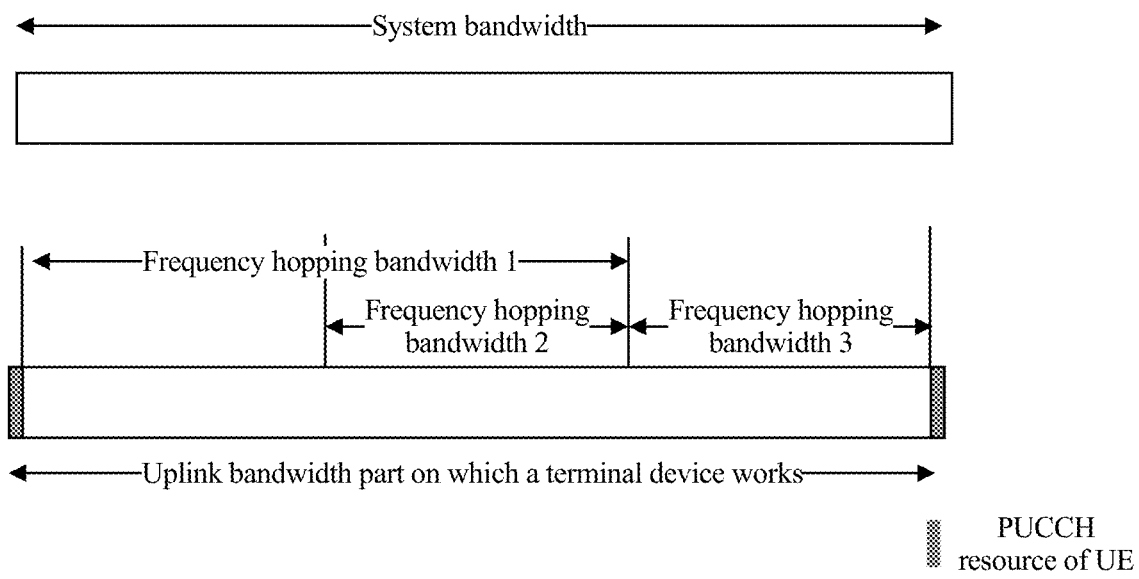

In the embodiment of the application, the network device may semi-statically configure, for the terminal device by using higher layer signaling, a size of each frequency hopping bandwidth and a frequency domain position in an uplink working bandwidth part on which the terminal device works (that is, an uplink bandwidth part activated by current UE). When the network device configures a plurality of frequency hopping bandwidths for the terminal device, the plurality of frequency hopping bandwidths may overlap or not overlap in frequency domain. For example, as shown in FIG. 5a, a network device configures three frequency hopping bandwidths for a terminal device in an uplink working bandwidth part on which the terminal device works: a frequency hopping bandwidth 1, a frequency hopping bandwidth 2, and a frequency hopping bandwidth 3. The frequency hopping bandwidth 1, the frequency hopping bandwidth 2, and the frequency hopping bandwidth 3 may completely not overlap in frequency domain. For another example, as shown in FIG. 5b, a network device configures three frequency hopping bandwidths for a terminal device in an uplink working bandwidth part on which the terminal device works: a frequency hopping bandwidth 1, a frequency hopping bandwidth 2, and a frequency hopping bandwidth 3. The frequency hopping bandwidth 1, the frequency hopping bandwidth 2, and the frequency hopping bandwidth 3 may partially overlap in the frequency domain.

In the embodiment of the application, the uplink bandwidth part on which the terminal device works may be referred to as an uplink bandwidth part (UL BWP). It should be noted that, in a new radio (NR) system, a concept of uplink bandwidth part is introduced. The network device may configure one or more uplink bandwidth parts for the terminal device. The uplink bandwidth part includes a group of contiguous PRB resources, and the uplink bandwidth part may be less than or equal to the uplink system bandwidth supported by the terminal device. In addition, it is stipulated in the NR that the network device may schedule the terminal device to transmit a physical uplink shared channel resource in the uplink bandwidth part.

Operation S42: The network device activates at least one frequency hopping bandwidth in the frequency hopping bandwidths of the terminal device.

In the embodiment of the application, the network device may activate one frequency hopping bandwidth device, or may activate a plurality of frequency hopping bandwidths in the frequency hopping bandwidths of the terminal device.

In the embodiment of the application, still as shown in FIG. 5a, the network device may activate only the frequency hopping bandwidth 1 or both the frequency hopping bandwidth 1 and the frequency hopping bandwidth 2, or may activate the frequency hopping bandwidth 1, the frequency hopping bandwidth 2, and the frequency hopping bandwidth 3 in the three frequency hopping bandwidths of the terminal device. Details are not described herein again.

In the embodiment of the application, the network device may combine the frequency hopping bandwidths of the terminal device into a plurality of frequency hopping bandwidth combinations, and then activate one of the frequency hopping bandwidth combinations.

Figure 6:
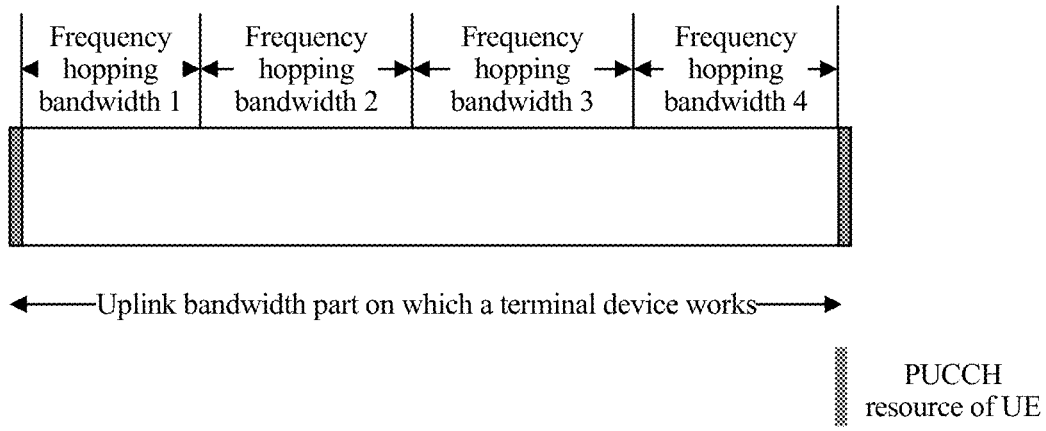

For example, as shown in FIG. 6, a network device configures four frequency hopping bandwidths for the terminal device: a frequency hopping bandwidth 1, a frequency hopping bandwidth 2, a frequency hopping bandwidth 3, and a frequency hopping bandwidth 4. The network device may combine the four frequency hopping bandwidths of the terminal device into three frequency hopping bandwidth combinations: a frequency hopping bandwidth combination 1, a frequency hopping bandwidth combination 2, a frequency hopping bandwidth combination 3, and a frequency hopping bandwidth combination 4:

the frequency hopping bandwidth combination 1: the frequency hopping bandwidth 1 and the frequency hopping bandwidth 4;

the frequency hopping bandwidth combination 2: the frequency hopping bandwidth 2 and the frequency hopping bandwidth 3; and the frequency hopping bandwidth combination 3: the frequency hopping bandwidth 1 and the frequency hopping bandwidth 2.

In this case, first indication information may be 2-bit signaling (for example, a 2-bit information field in DCI), and is used to indicate one of the foregoing activated frequency hopping bandwidth combinations. However, a quantity of bits of the first indication information is not limited in embodiments of the invention, and may be determined based on a quantity of the frequency hopping combinations.

Optionally, a manner and the quantity of the frequency hopping combinations may be semi-statically configured by using higher layer signaling.

In the embodiment of the application, the network device may activate one or more frequency hopping bandwidth combinations. For example, the network device may activate only the frequency hopping bandwidth combination 1. For another example, the network device may activate both the frequency hopping bandwidth combination 1 and the frequency hopping bandwidth combination 2. Details are not described herein again.

In the embodiment of the application, the network device may alternatively activate one or more frequency hopping bandwidths in the foregoing combinations. For example, the network device may activate only the frequency hopping bandwidth 4 in the frequency hopping bandwidth combination 1, or may activate both the frequency hopping bandwidth 1 and the frequency hopping bandwidth 4 in the frequency hopping bandwidth combination 1, or may activate both the frequency hopping bandwidth 1 in the frequency hopping bandwidth combination 1 and the frequency hopping bandwidth 2 in the frequency hopping bandwidth combination 2.

Operation S43: The network device sends the first indication information to the terminal device, where the first indication information is used to indicate the activated frequency hopping bandwidth.

Operation S44: The terminal device determines, based on the first indication information, the frequency hopping bandwidth activated by the network device.

Operation S45: The terminal device sends the physical uplink shared channel resource to the network device on the activated frequency hopping bandwidth.

Preferably, the terminal device sends, based on uplink resource scheduling information and the first indication information that are sent by the network device, the physical uplink shared channel resource to the network device in one slot and in one activated frequency hopping bandwidth.

Figure 7:
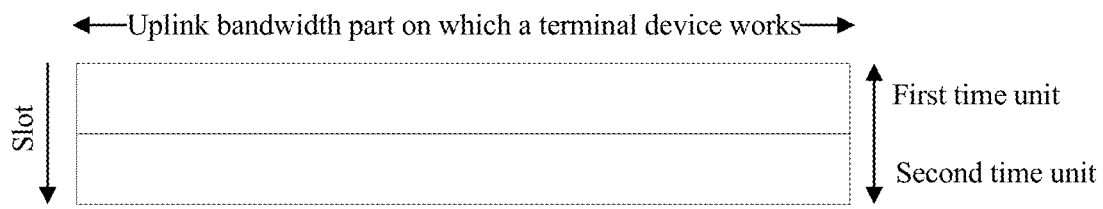
FIG. 7 is a schematic diagram of a slot according to an embodiment of the application.

In the embodiment of the application, the terminal device may send, in a unit of a slot, the physical uplink shared channel resource to the network device. As shown in FIG. 7, one slot may include two time units: a first time unit and a second time unit.

Preferably, the first time unit and the second time unit do not overlap each other in time domain. Time domain lengths of the first time unit and the second time unit and time domain positions of the first time unit and the second time unit in a slot may be preconfigured by the system or may be configured by using higher layer signaling.

In an example of the embodiment of the application, one slot may occupy 14 orthogonal frequency division multiplexing (OFDM) symbols numbered 0 to 13. The first time unit may occupy seven OFDM symbols numbered 0 to 6, and the second time unit occupies seven OFDM symbols numbered 7 to 13.

In the embodiment of the application, the terminal device may perform frequency hopping to transmit the physical uplink shared channel resource on the activated frequency hopping bandwidth and in the first time unit and the second time unit.

Figure 8:
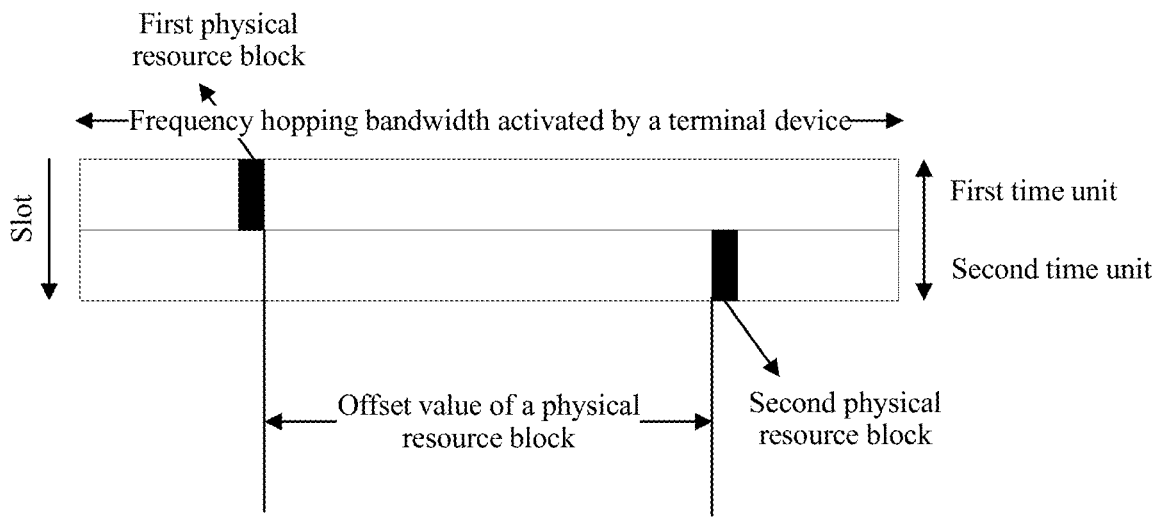
FIG. 8 is a schematic diagram of an offset value of a physical resource block according to an embodiment of the application.

In an example of the application, for example, as shown in FIG. 8, the terminal device may transmit, in an activated frequency hopping bandwidth, a first physical resource block of the physical uplink shared channel resource in the first time unit, and a second physical resource block of the physical uplink shared channel resource in the second time unit. The second physical resource block and the first physical resource block have an offset in frequency domain, and the offset of the second physical resource block relative to the first physical resource block is referred to as an offset. The network device may send second indication information to the terminal device, where the second indication information may indicate the offset of the second physical resource block relative to the first physical resource block. Specifically, the network device may send downlink control information signaling to the terminal device, where the downlink control signaling carries an offset of the physical resource block.

Figure 9:
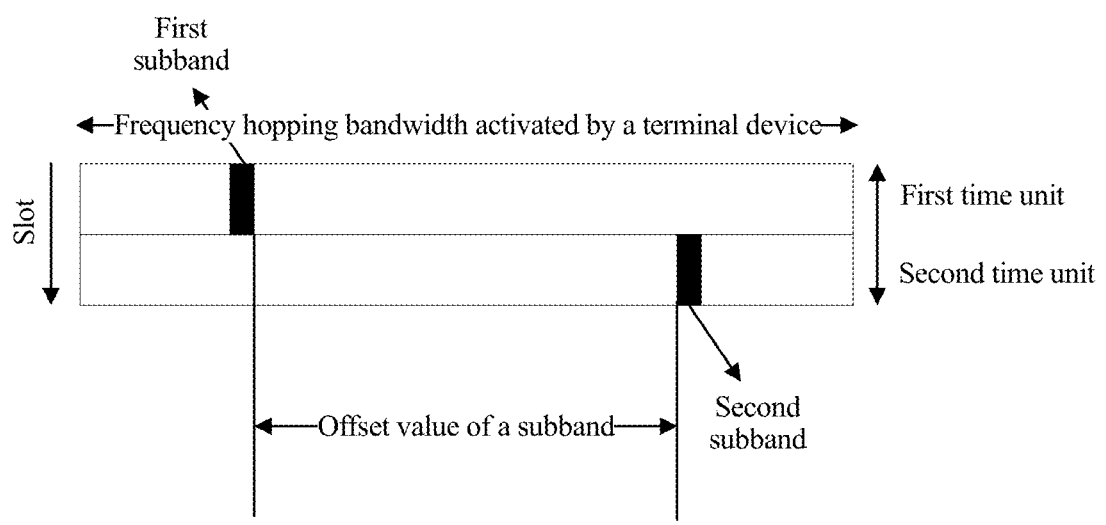
FIG. 9 is a schematic diagram of a subband offset value according to an embodiment of the application.

In another example of the embodiment of the application, the network device may configure a quantity of subbands for each frequency hopping bandwidth of the terminal device by using higher layer signaling. The quantities of subbands included in different frequency hopping bandwidths may be the same, or may be different. For example, the quantity of the frequency hopping bandwidths may be determined based on a size of each frequency hopping bandwidth. As shown in FIG. 9, the terminal device may transmit, on the activated frequency hopping bandwidth, a physical uplink shared channel resource on a physical resource block of a first subband of the first time unit, and a physical uplink shared channel resource on a physical resource block of a second subband of the second time unit. The second subband and the first subband have an offset in frequency domain, and the offset of the second subband relative to the first subband is a subband offset value. It should be noted that the transmitted physical uplink shared channel resource may occupy some or all physical resource blocks of the first subband, and the transmitted physical uplink shared channel resource may occupy some or all physical resource blocks of the second subband. The network device may send second indication information to the terminal device, where the second indication information is used to indicate a subband offset value. Specifically, the network device may send downlink control information signaling to the terminal device, where the downlink control signaling carries the second indication information.

Further, the network device may represent the foregoing subband offset value by using a frequency hopping pattern. For example, 2-bit signaling may be used to represent the frequency hopping pattern. When the subband offset value is +1, a corresponding frequency hopping pattern value may be 00; and when the subband offset value is −1, a corresponding frequency hopping pattern value may be 01. Correspondingly, in this case, the second indication information is used to indicate the frequency hopping pattern.

Specifically, the network device may preset by a system or configure by using higher layer signaling, a plurality of subband offset values, and in addition, preset by the system or configure by using the higher layer signaling, a frequency hopping pattern corresponding to each subband offset value. When sending the second indication information, the network device may select a subband offset value from the plurality of subband offset values, obtain a corresponding frequency hopping pattern based on the selected subband offset value, and generate the second indication information based on the frequency hopping pattern, where the second indication information carries the frequency hopping pattern. For example, there may be a correspondence between the subband offset value and the frequency hopping pattern; and the network device may determine, based on the selected subband offset value, the frequency hopping pattern corresponding to the selected subband offset value.

Optionally, for each frequency hopping bandwidth configured by the network device for the terminal device, a subband offset value of each frequency hopping bandwidth and a corresponding frequency hopping pattern may be configured by using the higher layer signaling.

In the embodiment of the application, for example, when the subband offset value corresponding to the frequency hopping pattern carried in the second indication information is K, the physical resource block used by the terminal device to send the physical uplink shared channel to the network device in the second time unit on the activated frequency hopping bandwidth has a frequency-domain cyclic offset of K*N in the frequency hopping bandwidth relative to a physical resource block used by the terminal device to send the physical uplink shared channel to the network device in the first time unit in the same activated frequency hopping bandwidth, where N is a quantity of physical resource blocks occupied by each subband, and both K and N are integers.

In the embodiment of the application, when a network device schedules the physical uplink shared channel resource for a plurality of terminal devices in a same slot, and uplink working bandwidth parts on which the plurality of terminal devices work overlap, the foregoing method in the embodiment of the application can be used to prevent physical uplink shared channel resources of different terminal devices from collision in frequency domain. Details are as follows.

Figure 10:
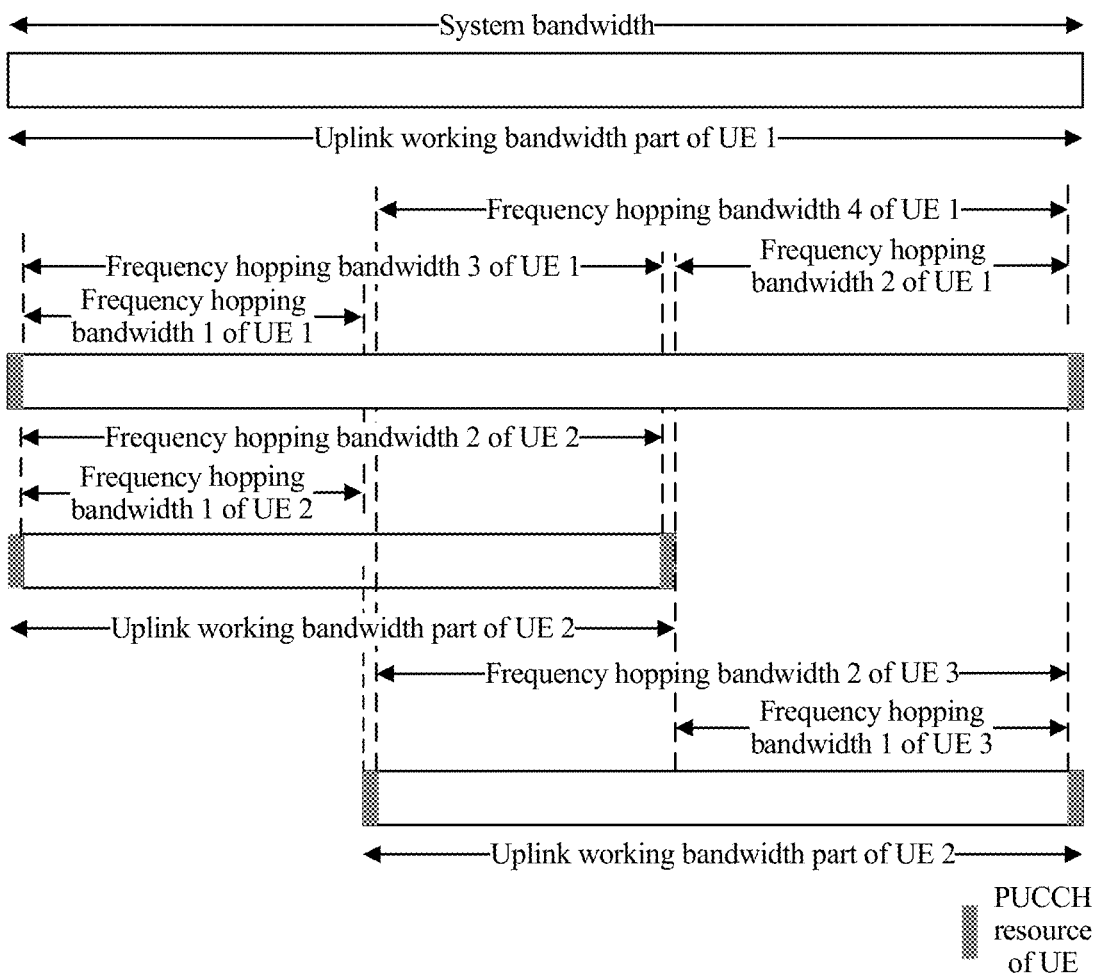
FIG. 10 is a schematic diagram of a frequency hopping bandwidth according to an embodiment of the application.

For example, as shown in FIG. 10, when uplink working bandwidth parts on which the three terminal devices UE 1, UE 2, and UE 3 work overlap, the network device configures four frequency hopping bandwidths for the UE 1: a frequency hopping bandwidth 1, a frequency hopping bandwidth 2, a frequency hopping bandwidth 3, and a frequency hopping bandwidth 4; configures two frequency hopping bandwidths for the UE 2: a frequency hopping bandwidth 1 and a frequency hopping bandwidth 2; and configures two frequency hopping bandwidths for the UE 3: a frequency hopping bandwidth 1 and a frequency hopping bandwidth 2.

In the embodiment of the application, still referring to FIG. 10, when a network device schedules a physical uplink shared channel resource for three terminal devices in a same slot, for UE 1, a base station may configure, by using higher layer signaling, a frequency hopping bandwidth 1 for activating the UE 1; for UE 2, the base station may configure, by using the higher layer signaling, a frequency hopping bandwidth 1 for activating the UE 2; and for UE 3, the base station may configure, by using the higher layer signaling, a frequency hopping bandwidth 1 for activating the UE 3, or may configure, by using the higher layer signaling, a frequency hopping bandwidth 2 for activating the UE 3.

It may be learned from FIG. 10 that the frequency hopping bandwidth 1 of the UE 1 activated by the UE 1 and the frequency hopping bandwidth 1 of the UE 2 activated by the UE 2 overlap in frequency domain; the frequency hopping bandwidth 1 of the UE 3 activated by the UE 3 or the frequency hopping bandwidth 2 of the UE 3 activated by the UE 3 do not overlap; and the frequency hopping bandwidth 1 of the UE 2 activated by UE 2 and the frequency hopping bandwidth 1 of the UE 1 activated by UE 1 do not overlap.

In this case, the network device may allocate, in frequency domain, non-overlapping physical resource blocks to the frequency hopping bandwidth 1 of the UE 1 and the frequency hopping bandwidth 1 of the UE 2, so that when the UE 1 and the UE 2 transmit, on the activated frequency hopping bandwidth 1, physical uplink shared channel resources through frequency hopping, occupied physical resource blocks do not collide.

It can be learned from the foregoing description that, in the application, when uplink working bandwidth parts on which different UEs work overlap, congestion and collision are avoided when physical uplink shared channel resources are transmitted in the working bandwidth parts of the different UEs through frequency hopping, thereby increasing utilization of uplink resources.

Figure 11:
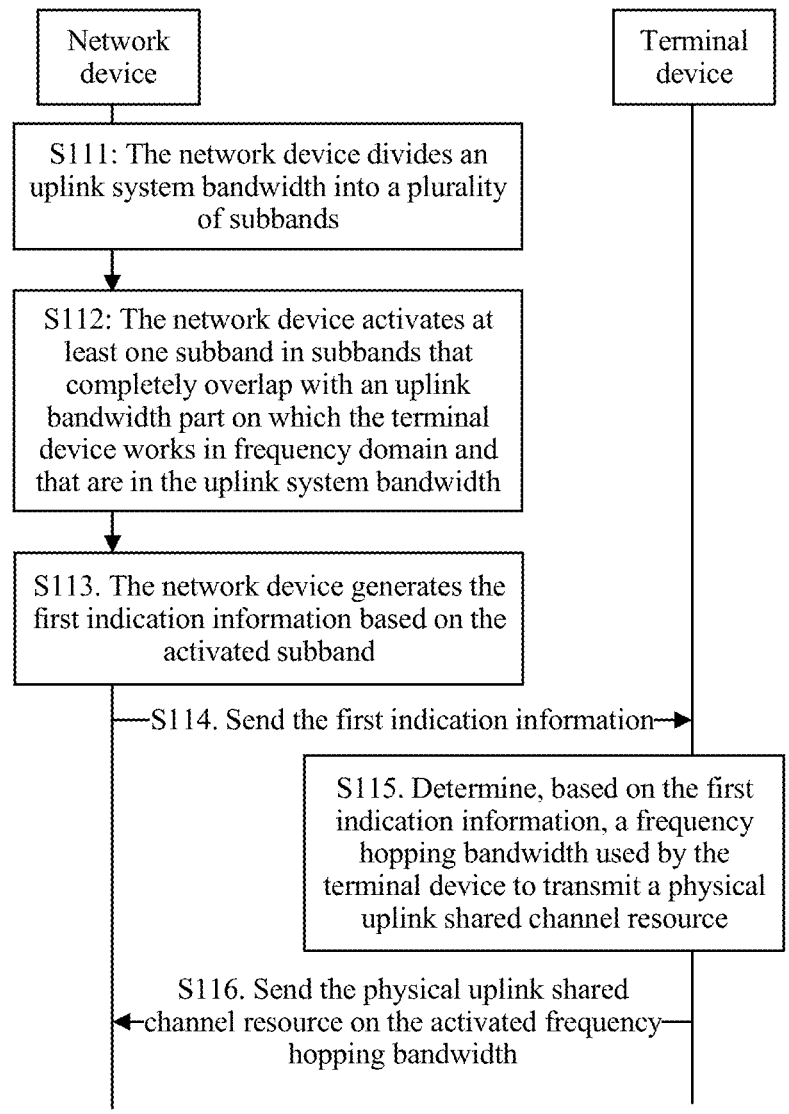
FIG. 11 is a schematic flowchart of a communication method according to an embodiment of the application.

FIG. 11 is a procedure of a communication method according to an embodiment of the application. A terminal device in this procedure corresponds to the terminal device 10 in FIG. 2, and a network device may correspond to the base station 20 in FIG. 2. As shown in FIG. 11, the procedure includes the following operations.

Operation S111: The network device divides an uplink system bandwidth into a plurality of subbands.

In the embodiment of the application, the network device may sequentially number all physical resource blocks of the uplink system bandwidth based on a quantity of physical resource blocks (PRBs) of the uplink system bandwidth, and then divide the uplink system bandwidth into several subbands with an equal bandwidth based on numbers of all the PRBs of the uplink system bandwidth, and perform indexing on the subbands based on the numbers. In addition, the bandwidth size and frequency domain location of each subband are preconfigured by the system or semi-statically configured by using higher layer signaling.

Figure 12:
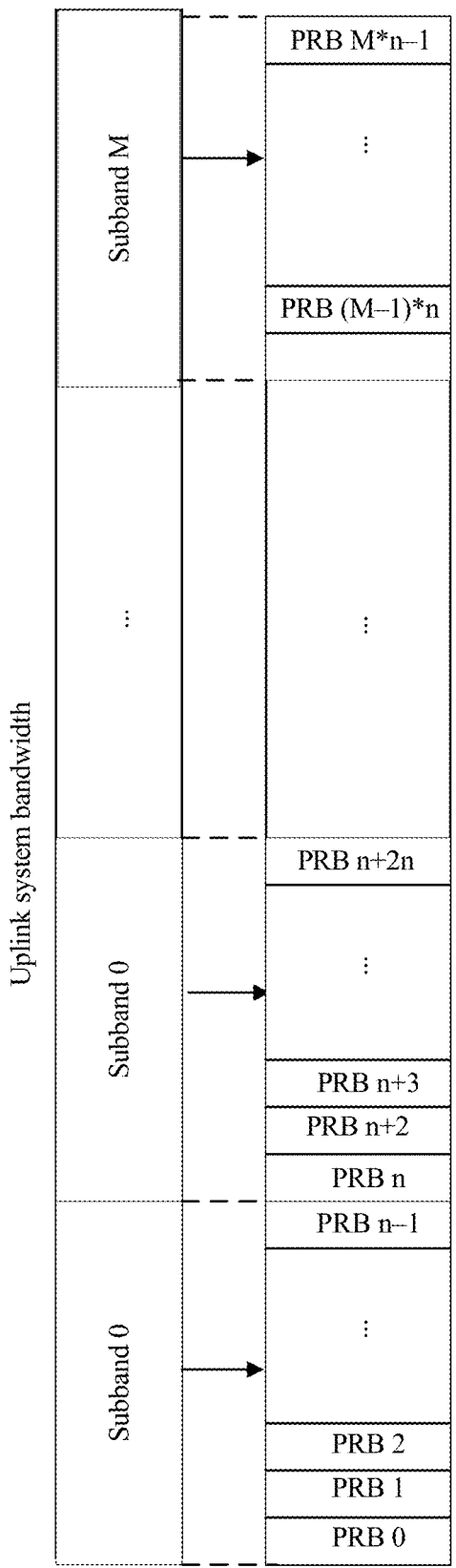
FIG. 12 is a schematic diagram of a subband division according to an embodiment of the application.

Preferably, the uplink system bandwidth may include one or more subbands that are contiguously distributed in the frequency domain. All the subbands have equal bandwidths, and all the subbands include equal quantities of PRBs that are contiguously distributed in the frequency domain. In addition, different subbands do not overlap each other in the frequency domain. As shown in FIG. 12, the uplink system bandwidth is divided into M subbands: a subband 0 and a subband 1 to a subband M-1, where each subband includes n PRBs. In this case, the subband 0 may correspond to PRBs numbered 0 to n−1, the subband 1 may correspond to PRBs numbered 1 to 2n−1, and the subband M may correspond to PRBs numbered (M-1)* n to M-1.

Operation S112: The network device activates at least one subband in subbands that completely overlap with an uplink bandwidth part on which the terminal device works in frequency domain and that are in the uplink system bandwidth.

Figure 13:
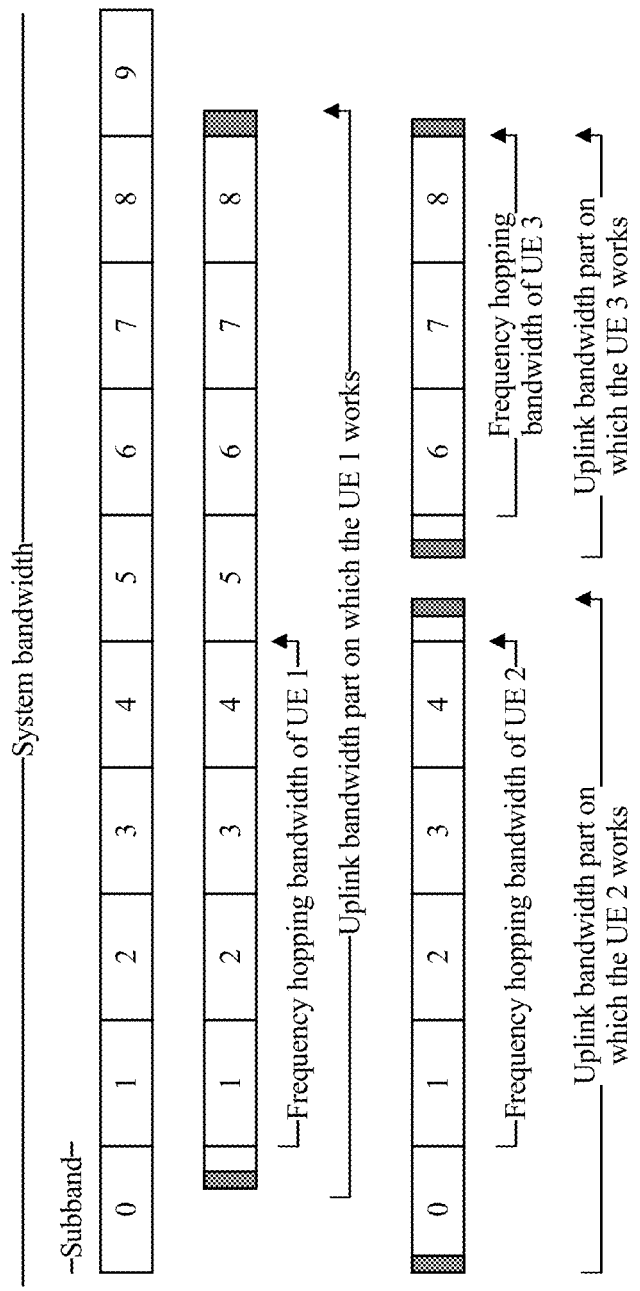
FIG. 13 and FIG. 14 are schematic diagrams of a subband division according to an embodiment of the application.

In the embodiment of the application, the uplink bandwidth part of the terminal device includes one or more subbands that completely overlap with the uplink bandwidth part. The network device may indicate an index value of the subband for the terminal device to activate a corresponding subband by using the higher layer signaling. These activated subbands form one or more frequency hopping bandwidths used by the terminal device to transmit a physical uplink shared channel resource. In the embodiment of the application, as shown in FIG. 13, the network device divides an uplink system bandwidth into 10 subbands: subbands 0 to 9. Subbands that completely overlap with the uplink working bandwidth part of the UE 1 in frequency domain and that are in the uplink system bandwidth are a subband 1 to a subband 8. In this case, the network device may activate one or more subbands in the subband 1 to the subband 8. For example, the network device may activate the subband 1 to the subband 4, and the subband 1 to the subband 4 form a frequency hopping bandwidth used by the UE 1 to transmit a physical uplink shared channel resource. For another example, subbands that completely overlap with the uplink working bandwidth part of the UE 2 in frequency domain and that are in the uplink system bandwidth are a subband 1 to a subband 4. In this case, the network device may activate one or more subbands in the subband 1 to the subband 4. For example, the network device may activate the subband 1 to the subband 4, and the subband 1 to the subband 4 form a frequency hopping bandwidth used by the UE 2 to transmit a physical uplink shared channel resource. In addition, subbands that completely overlap with the uplink working bandwidth part of the UE 3 in frequency domain and that are in the uplink system bandwidth are a subband 6 to a subband 8. In this case, the network device may activate one or more subbands in the subband 6 to the subband 8. For example, the network device may activate the subband 6 to the subband 8, and the subband 6 to the subband 8 form a frequency hopping bandwidth used by the UE 3 to transmit a physical uplink shared channel resource.

Figure 14:
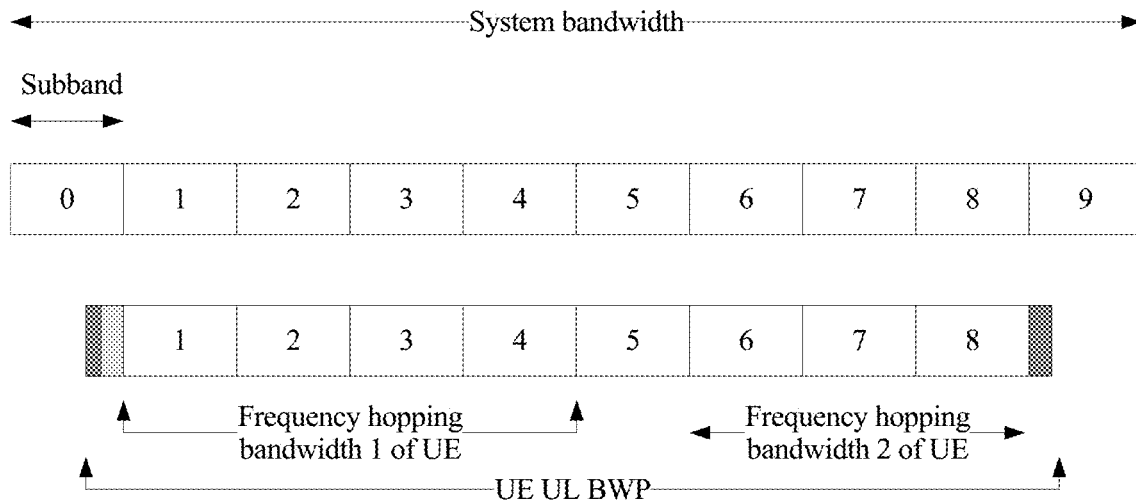

In the embodiment of the application, as shown in FIG. 14, the network device may divide an uplink system bandwidth into 10 subbands: subbands 0 to 9. Subbands that completely overlap with the uplink working bandwidth part of the UE 1 in frequency domain and that are in the uplink system bandwidth are a subband 1 to a subband 8. In this case, the network device may activate one or more subbands in the subband 1 to the subband 8. For example, the network device may activate the subband 1 to the subband 4, and the subband 1 to the subband 4 form a frequency hopping bandwidth 1 used by the UE to transmit a physical uplink shared channel resource; and in addition, the network device may activate the subband 6 to the subband 8, and the subband 6 to the subband 8 form a frequency hopping bandwidth 2 used by the UE to transmit a physical uplink shared channel resource.

Operation S113: The network device generates the first indication information based on the activated subband, where the first indication information carries the activated subband, and a frequency hopping bandwidth formed by the activated subband is used by the terminal device to send the physical uplink shared channel resource.

Preferably, the first indication information indicates an index value of an activated subband that forms the frequency hopping bandwidth.

Optionally, when the activated subband forms the plurality of frequency hopping bandwidths used by the terminal device to transmit the physical uplink shared channel resource, the first indication information also indicates an activated subband included in each frequency hopping bandwidth, for example, an index value of the activated subband included in each frequency hopping bandwidth. For example, still as shown in FIG. 14, when the network device activates the subband 6 to the subband 8, and the subband 6 and the subband 8 form the frequency hopping bandwidth 1, the first indication information may be an index value of the frequency hopping bandwidth 1, and index values of a subband 1 to a subband 4 of the frequency hopping bandwidth; and an index value of the frequency hopping bandwidth 2, and index values of the subband 6 to the subband 8 of the frequency hopping bandwidth.

Operation S114: The network device sends the first indication information to the terminal device.

Operation S115: The terminal device determines, based on the first indication information, a frequency hopping bandwidth used by the terminal device to transmit a physical uplink shared channel resource.

Operation S116: The terminal device sends the physical uplink shared channel resource to the network device in the frequency hopping bandwidth formed by the activated subband.

In the embodiment of the application, the network device may further send second indication information to the terminal device, to indicate a frequency hopping pattern, where the frequency hopping pattern corresponds to the subband offset value. When the subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers. K may be +1, −1, +2, and the like. When K is +1, K represents that a frequency domain position at which a physical uplink shared channel resource is transmitted in the second time unit has a rightward cyclic offset of the quantity of physical resource blocks occupied by one subband in frequency hopping bandwidth relative to a frequency domain position at which a physical uplink shared channel resource is transmitted in the first time unit.

For the first time unit and the second time unit, refer to the foregoing description of the procedure shown in FIG. 4. The foregoing subband offset value may be described in the following manners:

In an example, the network device may configure a plurality of candidate subband offset values by using higher layer signaling, for example, the candidate subband offset values may be +1, −1, and +2 subbands, where each subband offset value corresponds to one frequency hopping pattern. In an embodiment, for a terminal device, the network device may select a subband offset value from the plurality of candidate subband offset values, convert the selected subband offset value into a frequency hopping pattern, and finally indicates the frequency hopping pattern to the terminal device by using the second indication information, where the second indication information may be physical downlink control information.

For example, a 2-bit information field in DCI may be used to indicate a frequency hopping pattern, and the frequency hopping pattern is configured by using the higher layer signaling or preconfigured by a system. For example, when the subband offset value is −1, a corresponding frequency hopping pattern value is 00; when the subband offset value is +1, a corresponding frequency hopping pattern value is 01; and when the subband offset value is +2, the corresponding frequency hopping pattern value is 11.

In the embodiment of the application, a correspondence between the frequency hopping pattern and the subband offset value may be configured by the network device for the terminal device by using the higher layer signaling. In the application, the foregoing second indication information may be carried in the DCI, and the second indication information may be a frequency hopping pattern.

Figure 15:
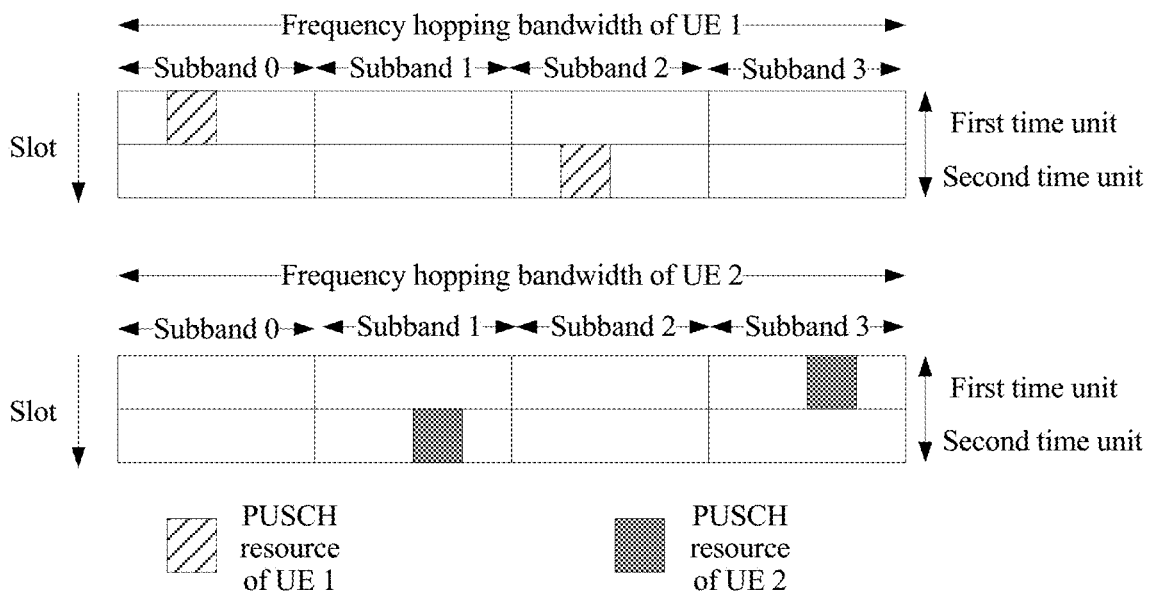
FIG. 15 is a schematic diagram of frequency hopping according to an embodiment of the application.

In the embodiment of the application, as shown in FIG. 15, for example, a frequency hopping bandwidth of the UE 1 and a frequency hopping bandwidth of the UE 2 completely overlap in frequency domain. In addition, in the first time unit, the UE 1 occupies some PRBs of the subband 0 to transmit a physical uplink shared channel resource. In the first time unit, the UE 2 occupies some PRBs of the subband 3 to transmit a physical uplink shared channel resource. In this case, when subband offsets represented by frequency hopping patterns of each of the UE 1 and the UE 2 are two subbands, in the second time unit, the UE 1 occupies some PRBs of the subband 2 to transmit the physical uplink shared channel resource, and the UE 2 occupies some PRBs of the subband 1 to transmit the physical uplink shared channel resource. Therefore, PRBs used by the UE 1 and the UE 2 to transmit the physical uplink shared channel resource do not collide. It should be noted that when the subband 3 is offset by two subbands, frequency hopping may be performed on the subband 3 to switch from the subband 3 to a PRB of the subband 1 after cyclically offsetting.

Optionally, when the subbands activated by the terminal device for the network device form a plurality of frequency hopping bandwidths, a plurality of candidate subband offset values and corresponding frequency hopping patterns of each frequency hopping bandwidth may be configured by using higher layer signaling.

In an example, the terminal device obtains the subband offset value based on a preset rule, and the network device does not need to indicate the subband offset value. For example, the subband offset value may be determined based on a slot number that is currently used to transmit a physical uplink shared channel resource and a quantity of subbands of a frequency hopping bandwidth on which the physical uplink shared channel resource is located, for example, $f_{hop}(i)=n_s(i) \bmod N_{sb}$, where $f_{hop}(i)$ is a quantity of subbands with a frequency hopping offset, $n_s(i)$ is the slot number, and $N_{sb}$ is a quantity of subbands in a frequency hopping bandwidth on which the PUSCH is located.

In the application, the network device may flexibly configure the frequency hopping bandwidth used by the terminal device to transmit the physical uplink shared channel resource, to improve flexibility of transmitting the physical uplink shared channel resource.

Figure 16:
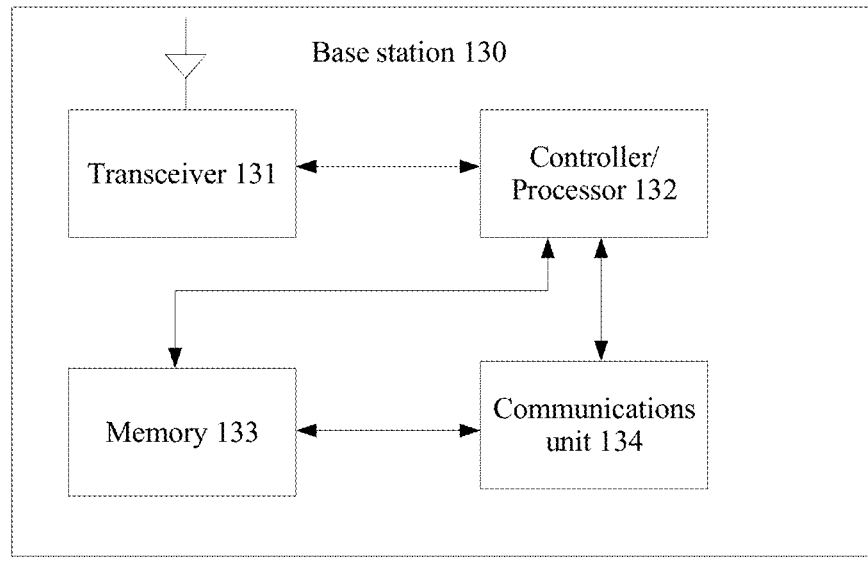
FIG. 16 is a schematic structural diagram of a base station according to an embodiment of the application.

FIG. 16 is a possible schematic structural diagram of a base station in the foregoing embodiment according to the application. The base station 130 may be the network device in FIG. 4, FIG. 5, and FIG. 11.

In the application, the base station 130 includes a transceiver 131 and a controller/processor 132. The transceiver 131 may be configured to support information sending and receiving between the base station and the terminal device in the foregoing embodiment, and support radio communication between the base station and a core network device.

The controller/processor 132 is configured to perform various functions used to communicate with the terminal device and the core network device. In an uplink, an uplink signal from the terminal device is received by using an antenna, is demodulated by the transceiver 131, and is further processed by the controller/processor 132 to restore service data and signaling information that are sent by the terminal device. In a downlink, service data and a signaling message are processed by the controller/processor 132, and are demodulated by the transceiver 131 to generate a downlink signal; and the downlink signal is transmitted by an antenna to the UE. The controller/processor 132 is further configured to perform the communication method described in the foregoing embodiment, for example, to determine first indication information. The controller/processor 132 is further configured to perform a processing process related to the base station in FIG. 4, FIG. 5, or FIG. 11 and/or another process used in the technology described in the application. The base station may further include a memory 133 that may be configured to store program code and data of the base station. The base station may further include a communications unit 134, configured to support the base station in communicating with another network entity.

It may be understood that FIG. 13 shows only a simplified design of the base station. In actual application, the base station may include any quantity of transmitters, receivers, processors, controllers, memories, communications units, and the like, and all base stations that can implement the application fall within the protection scope of the application.

Figure 17:
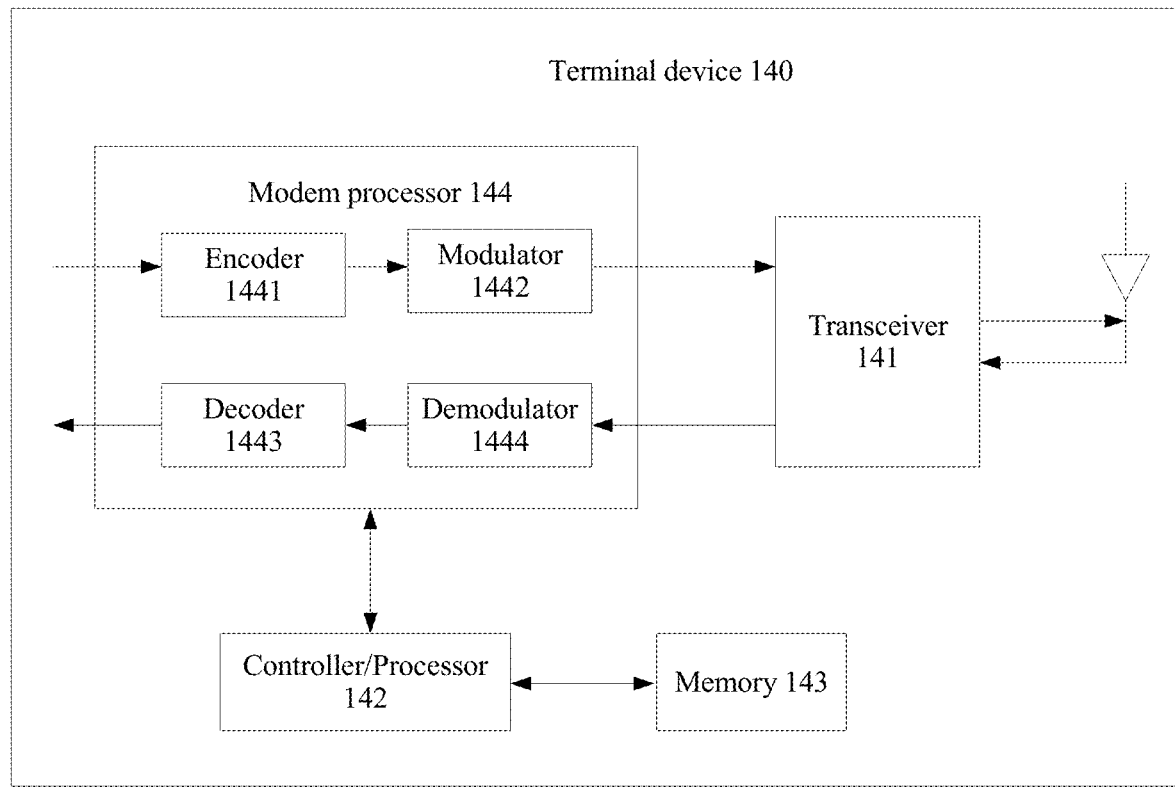
FIG. 17 is a schematic structural diagram of a terminal device according to an embodiment of the application.

FIG. 17 is a simplified schematic diagram of a possible design structure of a terminal device in the foregoing embodiment according to the application. The terminal device 140 may be one of the terminal devices shown in FIG. 4, FIG. 5, and FIG. 11. The terminal device includes a transceiver 141 and a controller/processor 142, and may further include a memory 143 and a modem processor 144.

The transceiver 141 performs adjustment (for example, analog conversion, filtering, amplification, and up-conversion) on the output sample, and generates an uplink signal. The uplink signal is transmitted by an antenna to the base station in the foregoing embodiment. In a downlink, the antenna receives a downlink signal transmitted by the base station in the foregoing embodiment. The transceiver 141 performs adjustment (for example, filtering, amplification, down-conversion, and digitization) on a signal received from the antenna, and provides an input sample. In the modem processor 144, an encoder 1441 receives service data and a signaling message that are to be sent in an uplink, and performs processing (for example, formatting, encoding, and interleaving) on the service data and the signaling message. A modulator 1442 further processes (for example, performs symbol mapping and modulation on) the encoded service data and the encoded signaling message, and provides an output sample. A decoder 1443 performs processing (for example, de-interleaving and decoding) on the symbol estimation, and provides decoded data and a decoded signaling message that are to be sent to the terminal device. A demodulator 1444 performs processing (for example, demodulation) on the input sample, and provides symbol estimation. The encoder 1441, the modulator 1442, the decoder 1443, and the demodulator 1444 may be implemented by the combined modem processor 144. These units perform processing based on a wireless technology (for example, an access technology in LTE or another evolved system) used by a radio access network.

The controller/processor 142 controls and manages an action of the terminal device, and is configured to perform processing performed by the terminal device in the foregoing embodiment. The terminal device determines, based on the first indication information, a frequency hopping bandwidth for sending a physical uplink shared channel resource. In an example, the controller/processor 142 may be configured to support the terminal device in performing the content related to the terminal device in FIG. 4, FIG. 5 or FIG. 11. The memory 143 is configured to store program code and data used by the terminal device.

Figure 18:
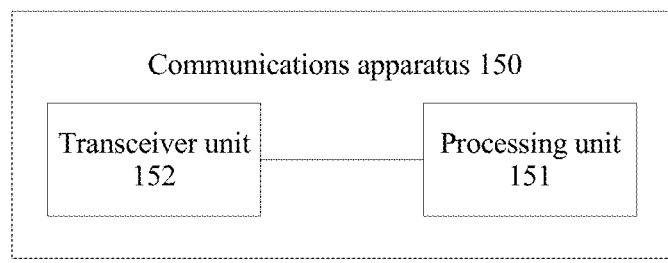
FIG. 18 and FIG. 19 are schematic diagrams of a communications apparatus according to an embodiment of the application.

As shown in FIG. 18, an embodiment of the application further provides a communications apparatus 150, including:

a processing unit 151, configured to generate first indication information, where the first indication information is used to indicate one or more frequency hopping bandwidths used by the terminal device to send a physical uplink shared channel resource to the network device; and a transceiver unit 152, configured to send the first indication information to the terminal device.

In the embodiment of the application, when sending the first indication information to the terminal device, the transceiver unit 152 is configured to send higher layer signaling to the terminal device, where the higher layer signaling carries the first indication information; or send MAC CE signaling to the terminal device, where the MAC CE signaling carries the first indication information; or send downlink control information signaling to the terminal device, where the downlink control information signaling carries the first indication information.

In the embodiment of the application, when generating the first indication information, the processing unit 151 is configured to activate, at least one frequency hopping bandwidth in frequency hopping bandwidths of the terminal device, where the frequency hopping bandwidths of the terminal device are configured by the network device for the terminal device based on an uplink bandwidth part on which the terminal device works; and generate the first indication information based on the activated frequency hopping bandwidth, where the first indication information carries the activated frequency hopping bandwidth, and the activated frequency hopping bandwidth is used by the terminal device to send the physical uplink shared channel resource.

In the embodiment of the application, each frequency hopping bandwidth of the terminal device includes at least one subband; and the processing unit 151 is further configured to configure a quantity of subbands for each frequency hopping bandwidth of the terminal device by using the higher layer signaling.

In the embodiment of the application, when generating the first indication information, the processing unit 151 is configured to divide an uplink system bandwidth into a plurality of subbands; activate at least one subband in subbands that completely overlap with an uplink bandwidth part on which the terminal device works in frequency domain and that are in the uplink system bandwidth; and generate the first indication information based on the activated subband, where the first indication information carries the activated subband, and a frequency hopping bandwidth including the activated subband is used by the terminal device to send the physical uplink shared channel resource.

In the embodiment of the application, a bandwidth size and a frequency domain position of each subband are preconfigured by a system or configured by using the higher layer signaling.

In the embodiment of the application, the network device schedules, in a unit of a slot, the terminal device to send the physical uplink shared channel resource, where one slot includes a first time unit and a second time unit; and the processing unit 151 is further configured to generate second indication information, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth; and the transceiver unit 152 is further configured to send the second indication information to the terminal device.

In the embodiment of the application, when generating the second indication information, the processing unit 151 is configured to select a subband offset value from a plurality of subband offset values; obtain a corresponding frequency hopping pattern based on the selected subband offset value; and generate the second indication information based on the frequency hopping pattern, where the second indication information carries the frequency hopping pattern; and when a subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In the embodiment of the application, the subband offset value corresponding to the frequency hopping pattern is preset by the network device or configured by the network device by using the higher layer signaling.

In the embodiment of the application, when sending the second indication information to the terminal device, the transceiver unit 152 is configured to send downlink control information signaling to the terminal device, where the downlink control information signaling carries the second indication information.

In the embodiment of the application, the transceiver unit 152 is further configured to receive, in a frequency hopping bandwidth on which the physical uplink shared channel resource is located, the physical uplink shared channel resource sent by the terminal device.

For detailed description of the foregoing communication method performed by the communications apparatus 150, refer to the description of the foregoing communication method. Details are not described herein again.

Figure 19:
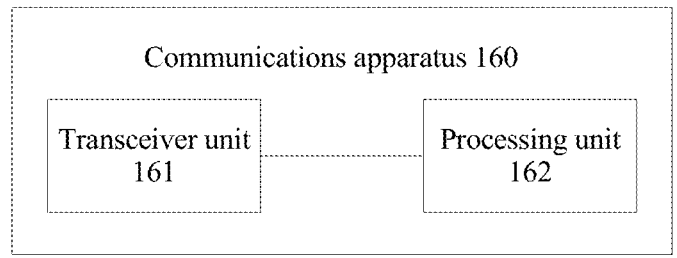

As shown in FIG. 19, an embodiment of the application further provides a communications apparatus 160, including a transceiver unit 161, configured to receive first indication information sent by a network device; and a processing unit 162, configured to determine, based on the first indication information, one or more frequency hopping bandwidths used by the terminal device to send a physical uplink shared channel resource.

In the embodiment of the application, when receiving the first indication information sent by the network device, the transceiver unit 161 is configured to receive higher layer signaling sent by the network device, where the higher layer signaling carries the first indication information; or receive MAC CE signaling sent by the network device, where the MAC CE signaling carries the first indication information; or receive DCI signaling sent by the network device, where the DCI signaling carries the first indication information.

In the embodiment of the application, the first indication information carries a frequency hopping bandwidth activated by the network device, the activated frequency hopping bandwidth is used by the terminal device to send the physical uplink shared channel resource, the activated frequency hopping bandwidth is at least one frequency hopping bandwidth activated by the network device in a frequency hopping bandwidth of the terminal device, and the frequency hopping bandwidth of the terminal device is configured by the network device for the terminal device based on an uplink bandwidth part on which the terminal device works.

In the embodiment of the application, each frequency hopping bandwidth of the terminal device includes at least one subband, and a quantity of subbands included in each frequency hopping bandwidth is configured by the network device for the terminal device by using the higher layer signaling.

In the embodiment of the application, the first indication information carries a subband activated by the network device, a frequency hopping bandwidth including the activated subband is used by the terminal device to send the physical uplink shared channel resource, and the activated subband is activated by the network device in subbands that completely overlap with an uplink bandwidth part on which the terminal device works in frequency domain and that are in the uplink system bandwidth.

In the embodiment of the application, a bandwidth size and a frequency domain position of each subband are preconfigured by a system or configured by using the higher layer signaling.

In the embodiment of the application, the terminal device sends, in a unit of a slot, the physical uplink shared channel resource to the network device, where one slot includes a first time unit and a second time unit; and the transceiver unit 161 is further configured to receive second indication information sent by the network device, where the second indication information is used to indicate a frequency-domain offset of a physical resource block used by the terminal device to send the physical uplink shared channel to the network device in the second time unit in the frequency hopping bandwidth relative to a physical resource block used by the terminal device to send the physical uplink shared channel to the network device in the first time unit in the same frequency hopping bandwidth.

In the embodiment of the application, the second indication information carries a frequency hopping pattern; the frequency hopping pattern corresponds to the subband offset value; and when the subband offset value corresponding to the frequency hopping pattern is K, the second indication information is used to indicate that the physical resource block used by the terminal device to send the physical uplink shared channel to the network device in the second time unit in the frequency hopping bandwidth has a frequency-domain cyclic offset of K*N in the frequency hopping bandwidth relative to the physical resource block used by the terminal device to send the physical uplink shared channel sent to the network device in the first time unit in the same frequency hopping bandwidth, where N is a quantity of physical resource blocks occupied by each subband, and both K and N are integers.

In the embodiment of the application, the subband offset value corresponding to the frequency hopping pattern is preset by the network device or configured by the network device by using the higher layer signaling.

In the embodiment of the application, when receiving the second indication information sent by the network device, the transceiver unit 161 is configured to receive downlink control information signaling sent by the network device, where the downlink control information signaling carries the second indication information.

In the embodiment of the application, the transceiver unit 161 is further configured to send, in the frequency hopping bandwidth indicated by the network device, the physical uplink shared channel resource to the network device.

For detailed description of the foregoing communication method performed by the communications apparatus 160, refer to the description of the foregoing communication method, and details are not described herein again.

An embodiment of the application provides a computer readable storage medium, including an instruction, where when the instruction runs on a communications device, the communications device performs the foregoing communication method.

An embodiment of the application further provides a chip, configured to implement the communication method provided in the embodiment of the application. The chip is connected to a memory, and may include a splitter and an encoder. Optionally, the chip may further include a check code attacher. For how the splitter, the encoder, and the check code splitter implement the communication method provided in the embodiment of the application, refer to descriptions of the technical solutions in FIG. 4, FIG. 5, and FIG. 11.

According to the method provided in the embodiments of the application, an embodiment of the application further provides a communications system, including the foregoing network device and one or more terminal devices.

It should be understood that, in the embodiment of the application, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

In an implementation process, operations in the foregoing methods can be implemented by using a hardware integrated logical circuit in the processor, or by using instructions in a form of software. The operations of the method disclosed with reference to the embodiments of the invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the operations in the foregoing methods in combination with hardware of the processor. To avoid repetition, details are not described herein again.

It should be further understood that "first", "second", "third", "fourth", and various numbers are merely used for differentiation for ease of description, and are not construed as a limitation on the scope of the embodiments of the invention.

It should be understood that sequence numbers of the foregoing processes do not mean execution sequences in the embodiments of the invention. The execution sequences of the processes should be determined according to functions and internal logic of the processes, and should not be construed as any limitation on the implementation processes of the embodiments of the invention.

A person of ordinary skill in the art may be aware that, in combination with illustrative logical blocks described in the embodiments disclosed in the specification and operations may be implemented by electronic hardware or a combination of computer software and electronic hardware. Whether the functions are performed by hardware or software depends on particular applications and design constraint conditions of the technical solutions. One of ordinary skill in the art may use different methods to implement the described functions for each particular application, but it should not be considered that the implementation goes beyond the scope of embodiments of the invention.

It may be clearly understood by one of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the invention may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

The foregoing descriptions are merely examples of embodiments of the invention, but are not intended to limit the protection scope of embodiments of the invention. Any variation or replacement readily figured out by one of ordinary skill in the art within the technical scope disclosed in the application shall fall within the protection scope of embodiments of the invention. Therefore, the protection scope of embodiments of the invention shall be subject to the protection scope of the claims.

What is claimed is:

1. A terminal device, comprising:
a transceiver, configured to receive first indication information sent by a network device wherein the first indication information comprises an indicator of a first frequency hopping bandwidth and an indicator of a second frequency hopping bandwidth, wherein each of the first frequency hopping bandwidth and the second frequency hopping bandwidth comprises at least one subband that is activated by the network device to form the first frequency hopping bandwidth and the second frequency hopping bandwidth for the terminal device; and
a processor, configured to determine, based on the first indication information, at least one of the first frequency hopping bandwidth and the second frequency bandwidth used by the terminal device to send a physical uplink shared channel resource.

2. The device according to claim 1, wherein when receiving the first indication information sent by the network device, the transceiver is configured to:
receive higher layer signaling sent by the network device, wherein the higher layer signaling carries the first indication information; or
receive MAC CE signaling sent by the network device, wherein the MAC CE signaling carries the first indication information; or
receive DCI signaling sent by the network device, wherein the DCI signaling carries the first indication information.

3. The device according to claim 1, wherein the first frequency hopping bandwidth and the second frequency hopping bandwidth of the terminal device are configured by the network device for the terminal device based on an uplink bandwidth part on which the terminal device works.

4. The device according to claim 3, wherein a quantity of subbands in each of the first frequency hopping bandwidth and the second frequency hopping bandwidth is configured by the network device for the terminal device by using higher layer signaling.

5. The device according to claim 1, wherein the first frequency hopping bandwidth formed by the at least one activated subband is used by the terminal device to send the physical uplink shared channel resource, and the at least one activated subband is in subbands that completely overlap with an uplink bandwidth part on which the terminal device works in frequency domain and that are in an uplink system bandwidth.

6. The device according claim 1, wherein the terminal device sends, in a unit of a slot, the physical uplink shared channel resource to the network device, the slot comprises a first time unit and a second time unit, and the transceiver is further configured to:
receive second indication information sent by the network device, wherein the second indication information is used to indicate a frequency-domain offset of a physical resource block used by the terminal device to send the physical uplink shared channel resource to the network device in the second time unit in a frequency hopping bandwidth relative to a physical resource block used by the terminal device to send the physical uplink shared channel resource to the network device in the first time unit in the same frequency hopping bandwidth.

7. The device according to claim 1, wherein the transceiver is further configured to:
send the physical uplink shared channel resource to the network device in one of the first frequency hopping bandwidth and the second frequency hopping bandwidth indicated by the network device.

8. A communication method, comprising:
receiving, by a terminal device, first indication information sent by a network device, wherein the first indication information comprises an indicator of a first frequency hopping bandwidth and an indicator of a second frequency hopping bandwidth, wherein each of the first frequency hopping bandwidth and the second frequency hopping bandwidth comprises at least one subband that is activated by the network device to form the first frequency hopping bandwidth and the second frequency hopping bandwidth for the terminal device; and
determining, by the terminal device based on the first indication information, at least one of the first frequency hopping bandwidth and the second frequency bandwidth used by the terminal device to send a physical uplink shared channel resource.

9. The method according to claim 8, wherein the receiving, by the terminal device, the first indication information sent by the network device comprises:
receiving, by the terminal device, higher layer signaling sent by the network device, wherein the higher layer signaling carries the first indication information; or
receiving, by the terminal device, MAC CE signaling sent by the network device, wherein the MAC CE signaling carries the first indication information; or
receiving, by the terminal device, DCI signaling sent by the network device, wherein the DCI signaling carries the first indication information.

10. The method according to claim 8, wherein the first frequency hopping bandwidth and the second frequency hopping bandwidth of the terminal device are configured by the network device for the terminal device based on an uplink bandwidth part on which the terminal device works.

11. The method according to claim 10, wherein a quantity of subbands in each of the first frequency hopping bandwidth and the second frequency hopping bandwidth is configured by the network device for the terminal device by using higher layer signaling.

12. The method according to claim 8, wherein the first frequency hopping bandwidth formed by the at least one activated subband is used by the terminal device to send the physical uplink shared channel resource, and the at least one activated subband is in subbands that completely overlap with an uplink bandwidth part on which the terminal device works in frequency domain and that are in an uplink system bandwidth.

13. The method according to claim 8, wherein the terminal device sends, in a unit of a slot, the physical uplink shared channel resource to the network device, the slot comprises a first time unit and a second time unit, and the method further comprises:
receiving, by the terminal device, second indication information sent by the network device, wherein the second indication information is used to indicate a frequency-domain offset of a physical resource block used by the terminal device to send the physical uplink shared channel resource to the network device in the second time unit in a frequency hopping bandwidth relative to a physical resource block used by the terminal device to send the physical uplink shared channel resource to the network device in the first time unit in the same frequency hopping bandwidth.

14. The method according to claim 8, wherein the method further comprises:
sending, by the terminal device, the physical uplink shared channel resource to the network device in one of the first frequency hopping bandwidth and the second frequency hopping bandwidth indicated by the network device.

15. A network device, comprising:
a processor, configured to generate first indication information comprising an indicator of a first frequency hopping bandwidth and an indicator of a second frequency hopping bandwidth, wherein each of the first frequency hopping bandwidth and the second frequency hopping bandwidth comprises at least one subband that is activated by the network device to form the first frequency hopping bandwidth and the second frequency hopping bandwidth for a terminal device, wherein the first indication information is used to indicate at least one of the first frequency hopping bandwidth and the second frequency bandwidth used by the terminal device to send a physical uplink shared channel resource to the network device; and
a transceiver, configured to send the first indication information to the terminal device.

16. The device according to claim 15, wherein when sending the first indication information to the terminal device, the transceiver is configured to:
send higher layer signaling to the terminal device, wherein the higher layer signaling carries the first indication information; or
send MAC CE signaling to the terminal device, wherein the MAC CE signaling carries the first indication information; or
send downlink control information signaling to the terminal device, wherein the downlink control information signaling carries the first indication information.

17. The device according to claim 15, wherein the processor is further configured to:
activate the at least one subband to form the first frequency hopping bandwidth in frequency hopping bandwidths of the terminal device, wherein the first frequency hopping bandwidth and the second frequency hopping bandwidth of the terminal device are configured by the network device for the terminal device based on an uplink bandwidth part on which the terminal device works; and
generate the first indication information based on the at least one activated subband, wherein the first frequency hopping bandwidth is used by the terminal device to send the physical uplink shared channel resource.

18. The device according to claim 15, wherein the processor is further configured to:
divide an uplink system bandwidth into a plurality of subbands;
activate the at least one subband in subbands that completely overlap with an uplink bandwidth part on which the terminal device works in frequency domain and that are in the uplink system bandwidth; and
generate the first indication information based on the at least one activated subband, wherein the first frequency hopping bandwidth formed by the at least one activated subband is used by the terminal device to send the physical uplink shared channel resource.

19. The device according to claim 15, wherein the network device schedules, in a unit of a slot, the terminal device to send the physical uplink shared channel resource, and the slot comprises a first time unit and a second time unit;
the processor is further configured to generate second indication information, wherein the second indication information is used to indicate a frequency-domain offset of a physical resource block used by the terminal device to send the physical uplink shared channel resource to the network device in the second time unit in a frequency hopping bandwidth relative to a physical resource block used by the terminal device to send the physical uplink shared channel resource to the network device in the first time unit in the same frequency hopping bandwidth; and
the transceiver is further configured to send the second indication information to the terminal device.

20. The device according to claim 15, wherein the transceiver is further configured to:
receive, in the first frequency hopping bandwidth on which the physical uplink shared channel resource is located, the physical uplink shared channel resource sent by the terminal device.

\* \* \* \* \*